United States Patent
Lee et al.

(10) Patent No.: US 9,641,872 B2
(45) Date of Patent: May 2, 2017

(54) NETWORK TELEVISION AND A METHOD OF CONTROLLING THE SAME

(75) Inventors: Hyung Nam Lee, Seoul (KR); Uni Young Kim, Seoul (KR); Sang Jun Koo, Seoul (KR); Sae Hun Jang, Seoul (KR); Kyung Hee Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 269 days.

(21) Appl. No.: 12/902,605

(22) Filed: Oct. 12, 2010

(65) Prior Publication Data

US 2011/0131610 A1    Jun. 2, 2011

(30) Foreign Application Priority Data

Nov. 30, 2009   (KR) .................. 10-2009-0117298

(51) Int. Cl.
*G06F 3/00* (2006.01)
*G06F 13/00* (2006.01)
(Continued)

(52) U.S. Cl.
CPC ............... *H04N 21/234318* (2013.01); *H04N 21/42204* (2013.01); *H04N 21/4438* (2013.01); *H04N 21/482* (2013.01); *H04N 21/812* (2013.01)

(58) Field of Classification Search
CPC ........... H04N 21/4312; H04N 21/4263; H04N 21/41422; H04N 21/414; H04N 21/84;
(Continued)

(56) References Cited

U.S. PATENT DOCUMENTS

| 5,524,195 A | 6/1996 | Clanton, III et al. |
| 5,583,560 A | 12/1996 | Florin et al. ............... 348/7 |

(Continued)

FOREIGN PATENT DOCUMENTS

| CN | 101340252 | 1/2009 |
| EP | 1 551 176 | 7/2005 |

(Continued)

OTHER PUBLICATIONS

International Search Report and Written Opinion dated Jun. 3, 2011 (PCT/KR2010/006850).

(Continued)

*Primary Examiner* — Nasser Goodarzi
*Assistant Examiner* — An Nguyen
(74) *Attorney, Agent, or Firm* — Ked & Associates, LLP

(57) ABSTRACT

A network TV includes a network interface, a user interface, and a controller. The network interface establishes a connection with at least one content provider server through a network. The user interface receives an input signal selecting an icon for display. The controller controls output of the selected icon for display along with an image corresponding to the selected icon. The selected icon corresponds to the content provider and is displayed with one or more other icons that correspond to additional content providers, and the image is based on information received through the network interface from the content provider. Further, a method is disclosed for displaying a real-time broadcast screen and icons for receiving contents at the same time, and easily switching between the real-time broadcast screen and a content providing screen in response to user input.

11 Claims, 42 Drawing Sheets

(51) Int. Cl.
*H04N 5/445* (2011.01)
*H04N 21/2343* (2011.01)
*H04N 21/422* (2011.01)
*H04N 21/443* (2011.01)
*H04N 21/482* (2011.01)
*H04N 21/81* (2011.01)

(58) Field of Classification Search
CPC ............. H04N 21/478; H04N 21/4126; H04N 21/482; H04N 21/4307; H04N 21/4758; H04N 21/47214; H04N 21/8586; H04N 21/462; H04N 21/422; H04N 21/258; H04N 21/43615; H04N 21/484; H04N 21/8405; H04N 21/4182; H04N 21/2543; H04N 21/431; H04N 21/2225; H04N 21/254; H04N 21/2343; H04N 21/4627; H04N 21/4782; H04N 21/438
USPC ...... 725/38, 39, 41, 45, 100, 14, 25, 28, 40, 725/48, 54, 32, 52, 62, 135, 43, 47, 139, 725/110, 86, 63, 59, 44, 105, 109, 114, 725/87, 111, 58, 136, 132, 144, 91; 715/730; 700/1; 348/159; 705/35
See application file for complete search history.

(56) References Cited

U.S. PATENT DOCUMENTS

| | | | |
|---|---|---|---|
| 5,745,710 A | 4/1998 | Clanton, III et al. | |
| 5,815,145 A * | 9/1998 | Matthews, III | 725/41 |
| 6,286,141 B1 | 9/2001 | Browne et al. | |
| 6,507,351 B1 | 1/2003 | Bixler | |
| 7,197,715 B1 | 3/2007 | Valeria | |
| 7,441,201 B1 | 10/2008 | Printezis | |
| 7,577,973 B1 | 8/2009 | Kapner, III et al. | |
| 7,929,056 B2 | 4/2011 | Tang et al. | |
| 2002/0097322 A1* | 7/2002 | Monroe | G08B 13/19643 348/159 |
| 2002/0129366 A1 | 9/2002 | Schein et al. | 725/43 |
| 2003/0028873 A1 | 2/2003 | Lemmons | |
| 2003/0204847 A1 | 10/2003 | Ellis et al. | |
| 2003/0212567 A1 | 11/2003 | Shintani et al. | |
| 2004/0028397 A1* | 2/2004 | Maekawa | G07F 17/26 396/2 |
| 2004/0078814 A1 | 4/2004 | Allen | 725/47 |
| 2004/0103439 A1 | 5/2004 | Macrae et al. | |
| 2004/0163117 A1* | 8/2004 | Rodriguez et al. | 725/100 |
| 2005/0155063 A1 | 7/2005 | Bayrakeri et al. | |
| 2006/0048069 A1 | 3/2006 | Igeta | |
| 2006/0107303 A1 | 5/2006 | Erhart et al. | |
| 2006/0184966 A1* | 8/2006 | Hunleth et al. | 725/39 |
| 2007/0011702 A1* | 1/2007 | Vaysman | H04N 21/84 725/45 |
| 2007/0233585 A1* | 10/2007 | Ben Simon | G06Q 40/00 705/35 |
| 2008/0052384 A1 | 2/2008 | Marl et al. | |
| 2008/0065235 A1* | 3/2008 | Igoe | H04L 12/2809 700/1 |
| 2008/0066103 A1* | 3/2008 | Ellis et al. | 725/38 |
| 2008/0086742 A1* | 4/2008 | Aldrey | H04H 60/33 725/24 |
| 2008/0092173 A1 | 4/2008 | Shannon et al. | |
| 2008/0115064 A1* | 5/2008 | Roach et al. | 715/730 |
| 2008/0184118 A1 | 7/2008 | Yun et al. | |
| 2008/0235749 A1 | 9/2008 | Jain et al. | |
| 2009/0262135 A1 | 10/2009 | Huston et al. | |
| 2010/0153999 A1 | 6/2010 | Yates | |
| 2011/0004517 A1 | 1/2011 | Soto et al. | |
| 2013/0125173 A1 | 5/2013 | Choi et al. | 725/51 |

FOREIGN PATENT DOCUMENTS

| | | |
|---|---|---|
| EP | 1 737 221 | 12/2006 |
| JP | 08-101756 | 4/1996 |
| JP | 2008-258894 A | 10/2008 |
| KR | 10-2003-0097843 A | 12/2003 |
| KR | 10-2006-0032872 A | 4/2006 |
| KR | 10-2007-0118908 A | 12/2007 |
| KR | 10-2008-0071452 A | 8/2008 |
| KR | 10-2009-0111231 A | 10/2009 |

OTHER PUBLICATIONS

International Search Report issued in PCT Appln No. PCT/KR2010/006851 dated May 25, 2011.
U.S. Office Action issued in U.S. Appl. No. 12/902,547 dated Oct. 5, 2012.
U.S. Final Office Action issued in U.S. Appl. No. 12/902,547 dated Jun. 19, 2013.
U.S. Office Action issued in co-pending U.S. Appl. No. 12/902,547 dated Jun. 17, 2014.
U.S. Office Action issued in co-pending U.S. Appl. No. 12/902,547 dated Oct. 31, 2014.
Chinese Office Action issued in related Application No. 201080054177.X dated Aug. 28, 2014.
European Search Report issued in related Application No. 10833474.9 dated Sep. 5, 2014.
Chinese Office Action issued in related Application No. 1201080053305.9 dated Apr. 2, 2014.
U.S. Appl. No. 12/902,547, filed Oct. 12, 2010, Mary Anne Kay.
European Office Action issued in related Application No. 10833474.9 dated May 7, 2015.
European Office Action issued in Application No. 10833475.6 dated Mar. 31, 2015.
U.S. Office Action issued in co-pending U.S. Appl. No. 12/902,547 dated May 8, 2015.
Korean Office Action issued in Application No. 10-2009-0117298 dated Aug. 13, 2015.
U.S. Office Action issued in co-pending U.S. Appl. No. 12/902,547 dated Sep. 17, 2015.
Korean Office Action dated Oct. 12, 2015 issued in Application No. 10-2009-0113968.
U.S. Office Action dated Feb. 22, 2016 issued in U.S. Appl. No. 12/902,547.
European Office Action dated Sep. 14, 2016 issued in Application No. 10833474.9.

* cited by examiner

Fig. 9
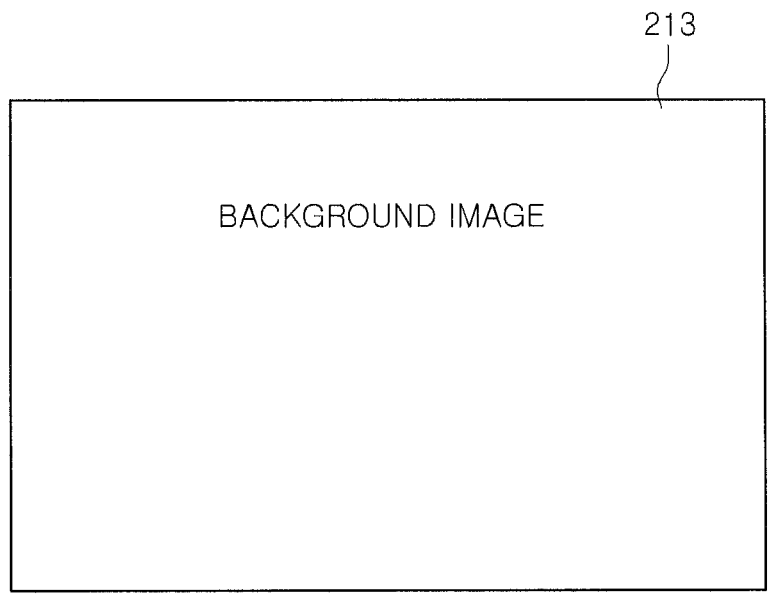
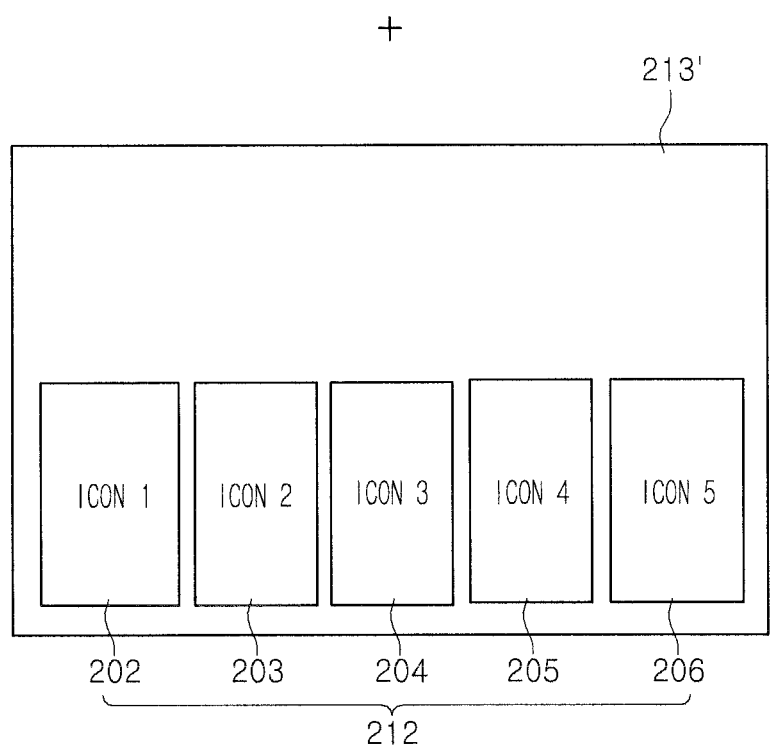

NETWORK TELEVISION AND A METHOD OF CONTROLLING THE SAME

CROSS-REFERENCE TO RELATED APPLICATION(S)

The present application claims the benefit of priority under 35 U.S.C. 119 to Korean Patent Application No. 10-2009-0117298 filed in Korea on Nov. 30, 2009 which is hereby incorporated by reference in its entirety.

BACKGROUND

1. Field

A network television and a method of controlling the same are disclosed herein.

2. Background

Network televisions and methods of controlling the same are known. However, they suffer from various disadvantages.

BRIEF DESCRIPTION OF THE DRAWINGS

The embodiments will be described in detail with reference to the following drawings in which like reference numerals refer to like elements, wherein:

FIGS. 8 and 9 show examples of menu screens that may be generated in accordance with the embodiments described herein;

DETAILED DESCRIPTION

Internet content may be provided on various types of display devices. One type of technology is Internet Protocol TV (IPTV), which seeks to transmit video, audio, and other forms of digital content to televisions through a high-speed Internet connection. Other types of technology may include broadband TV and web TV. Unlike IPTV, broadband and web TV may provide media information (e.g., VOD, game, visual telephone services, etc.) from several content providers. Further, a network TV as broadly described and embodied herein may optimize delivery of content to television users, and may also offer users with creative ways of controlling and navigating through the selection, viewing, and previewing of Internet content and of reviewing advertisement information.

Figure 1:
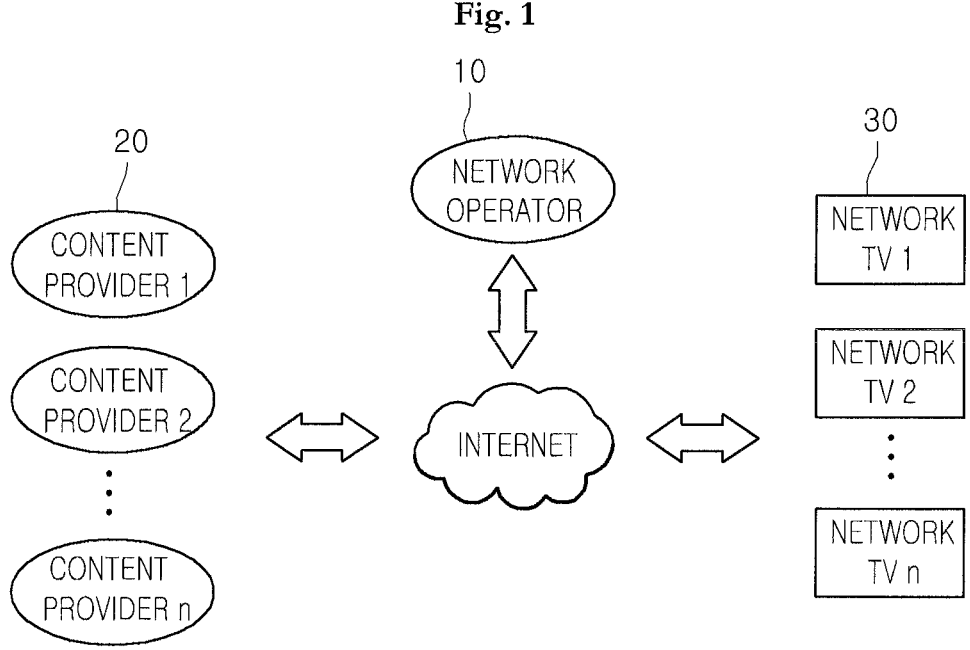
FIG. 1 shows one embodiment of a network TV system.

FIG. 1 shows one embodiment of a network TV system which may include a network operator 10, at least one content provider 20, and at least one network TV 30, which may be connected by a network, for example, the Internet. The network operator 10 may provide software, firmware, middleware, and/or other software routines that controls output of content provided by the content provider in the network TV 30, as well as application software for use during operation of the network TV 30. Further, the content provider may be provided with hardware information associated with the network TV 30 which may be used during normal execution of content in the network TV 30.

For example, the network operator may provide a basic screen frame for providing content provided by the content provider 20 to the network TV 30, and may provide a user interface to allow a user to select content, input various commands, or display a corresponding output. Further, the network operator may also provide data for updating firmware or software of the network TV 30. The network operator may also be the same as the manufacturer of the network TV 30.

The content provider 20 may generate various contents that may be provided on the network, form them in a format that may be played in the network TV 30, and then provide the content in accordance with a request of the network TV 30. The content may be any multimedia content that may be serviced through the network. According to one embodiment, the content provided by the content provider 20 may be provided directly to the network TV 30 through the Internet by the content provider 20 or via a network operator or administrator.

The network TV 30 may be provided with exclusive firmware for displaying content, searching, and displaying a list for each content provider 20. The firmware may be installed on the network TV 30 during manufacture of the network TV 30, or downloaded from the content provider 20 or the network operator for installation by a user.

The firmware of the network TV 30 may also include a program that plays or executes the content provided by the content provider 20. The firmware may be changed in accordance with various types of content provided by the content provider 20. For example, when the content provider 20 is a Video On Demand (VOD) provider, the firmware may include a VOD play program. When the content provider 20 is an Audio On Demand (AOD) or Music On Demand (MOD) provider, the firmware may include an AOD or MOD play program. Moreover, when the content provider 20 is a visual telephone provider, the firmware may include a visual telephone program.

The network TV 30 may receive content from the content provider 20 and plays or executes the content. The network TV 30 may be a TV equipped with a network module, a broadcast receiver such as a set top box, or any other type of display device equipped with a network module, for example, a network telephone. Simply for ease of explanation, a broadcast receiver that receives a broadcast signal is exemplified herein. However, embodiments broadly disclosed and embodied herein may be applied to any display device that may be connected to a network.

According to one embodiment, the content provider 20 may be a provider that makes or distributes a variety of content that will be provided to the network TV 30. The content provider 20 may, for example, include a TV broadcasting station, a radio station, a VOD provider, an AOD provider, a game provider, a visual telephone provider, a weather information provider, a photograph-related service provider, or other appropriate media content provider 20.

The TV broadcasting station may be a terrestrial or cable broadcasting station which may produce and store programs that users may watch and/or convert into a digital format for transmission. The radio broadcasting station may provide audio content with or without video content. The VOD provider and the AOD provider may have characteristics different from the TV broadcasting station or the radio broadcasting station. That is, the VOD or AOD provider may provide a service that allows a user to store and play desired broadcast programs, movies, music, and/or other media content.

For example, when a user cannot watch a desired live broadcast program, the user may download or play the corresponding media file at a website of the content provider 20 that provides this broadcast service. The AOD provider may provide streaming audio content. A MOD service provider may allow a user to download music. Further, a visual telephone provider may provide a relay service such that a user may make a video telephone call with a user of another network TV 30 over a network. A weather information provider may provide information on several local areas and a photograph-related service provider may provide a tool for editing and storing photographs.

The content provider 20 may also be any service provider that provides various services to the network TV 30 through the Internet, such as a PF (Packet Filter) server, an Electronic Program Guide (EPG) service provider, an Electronic Content Guide (ECG) service provider, a portal server operator, or other appropriate service providers.

The PF server may be serviced by an enterprise that manages all broadcast information and location information, etc., which are provided by the content provider 20. This service may contain, for example, broadcasting times or schedules of a corresponding broadcast station, location information needed for broadcasting, and contact information of the provider.

The EPG service provides EPG information that allows a user to search broadcast programs based on time and/or channel. The ECG service may provide a user with information regarding content available from the content provider 20 a location of a connection server, and access authority to the connection server. That is, it is an electronic program guide that may provide detailed information that allows for easily connecting to servers having the content as well as information regarding the content.

The portal server may be a web service provided from each broadcast station, and may be connected to a web server of a broadcast station or an enterprise that services content when receiving a request from a user terminal. The portal server may allow searching of a program list provided by a broadcast station or content provider 20.

The network TV 30 has a network interface for connecting with a network to receive and process data packets through the network using an assigned IP address, and may store or play the data packet when the data packet is multimedia data, such as video or audio data. The network TV 30 may bilaterally transmit a user request while processing multimedia data. Further, buttons for controlling the network TV 30 (e.g., buttons for selecting various menus) may be provided on an input device such as a remote controller that controls the network TV 30.

Figure 2:
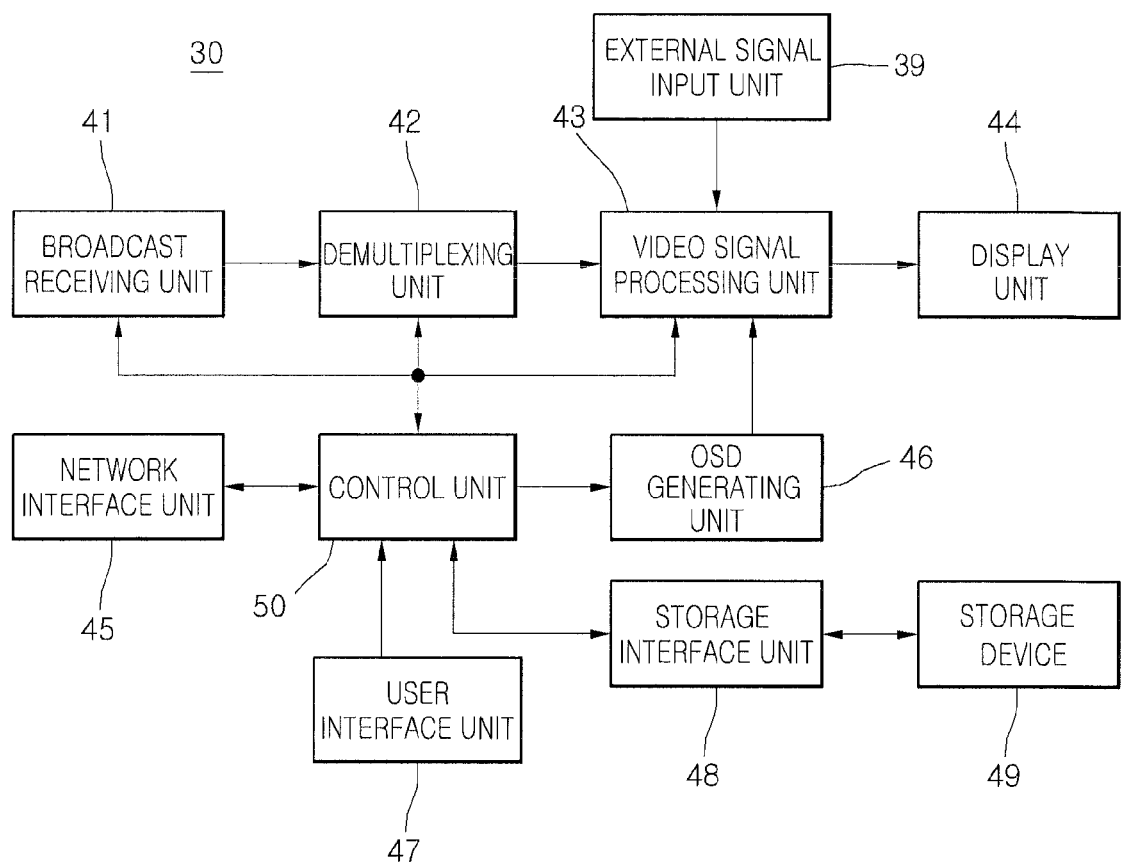
FIG. 2 shows an example of a network TV.

FIG. 2 shows one embodiment of the network TV 30. In addition to the function of receiving content through a network, the network TV 30 may be provided with a function of receiving RF signal type broadcast signals by wireless communication or through a cable. According to one embodiment, the network TV 30 may include a broadcast receiving unit 41, demultiplexing unit 42, video signal processing unit 43, display unit 44, a network interface unit 45, OSD generating unit 46, user interface unit 47, storage interface unit 48, storage device 49, external signal input unit 39, and a control unit 50.

The broadcast receiving unit 41, demultiplexing unit 42, and video signal processing unit 43 may be formed in one broadcast processing unit that receives broadcast signals and processes them into a type or format which may be outputted to the display unit 44 by performing various processes. When content is provided by digital broadcast, digital broadcast signals may be transmitted in transport stream type packetized data by time-division multiplexing video signals, audio signals, and additional data.

The broadcast receiving unit 41 may include an antenna that receives broadcast signals, and may also include a tuner that tunes a broadcast signal having a corresponding frequency band in accordance with a tuning control signal of the control unit 50, as described below. The broadcast receiving unit 41 may also include a demodulator that outputs the broadcast signal of a predetermined tuned channel by performing a Vestigial Sideband (VSB) modulating process and an error correcting process to the broadcast signal.

The broadcast signal received by the broadcast receiving unit may be divided into various additional data defined as, for example, a video signal, an audio signal, and a Program and System Information Protocol (PSIP) information by the demultiplexing unit, and then outputted in a bit stream. The video data separated by the demultiplexing unit are processed by the video signal processing unit 43 and displayed by the display unit 44. The video signal processing unit 43 may include an MPEG-2 decoder and a scaler that converts the video data to meet vertical frequency, resolution, screen ratio, etc., corresponding to output standards of the display unit 44.

The display unit 44 may be any one of a variety of displays such as a Digital Light Processing (DLP), an Liquid Crystal Display (LCD), Plasma Display Panel (PDP) or other appropriate types of displays. Further, the audio signal may be processed by a voice signal processing unit and outputted from a speaker, in which the voice signal processing unit may include an AC-3 decoder.

The additional data included in the additional data separated by demultiplexing unit 42 may be stored in storage device 49 through storage interface unit 48. The storage device may be implemented by an electrically erasable programmable read-only memory (EEPROM), or other appropriate types of storage or memory devices.

The user interface unit 47 may receive a request instruction from a user and generally may include an infrared receiving unit that receives an infrared signal inputted by a remote controller or a local key input unit disposed at one side of a panel. The network interface unit 45 receives content or data from the content provider 20 or the network operator through the network. That is, the network interface unit may receive content such as broadcast, games, VODs, broadcast signals, provided from the content provider 20 and the associated information. Further, network interface unit 45 may receive updates such as firmware updates which the network operator may provide.

The On Screen Display (OSD) generating unit 46 may generate a menu screen that receives the user's determination signal in an OSD. That is, the OSD generating unit 46 may display content, received through network interface unit 45, and the associated information through the display unit.

The external signal input unit 39 is an interface that may receive an input from other players, for example, DVD players or game consoles. It may be possible to output multimedia stored in other players to the display unit 44 by connecting the players to the external signal input unit. The control unit 50 may perform control operations in accordance with instructions input from user interface unit 47. The control unit may also receive and execute software of the content provider 20 received from the network operator, for example, a firmware update.

According to one embodiment, broadcast receiving unit 40 may output a 3D-image. The menu screen of the broadcast receiving unit may be provided in 3D and may also receive and output 3D-content when the content is provided by the content provider 20 in 3D. Additional components may be used in generating 3D-images.

Figure 3:
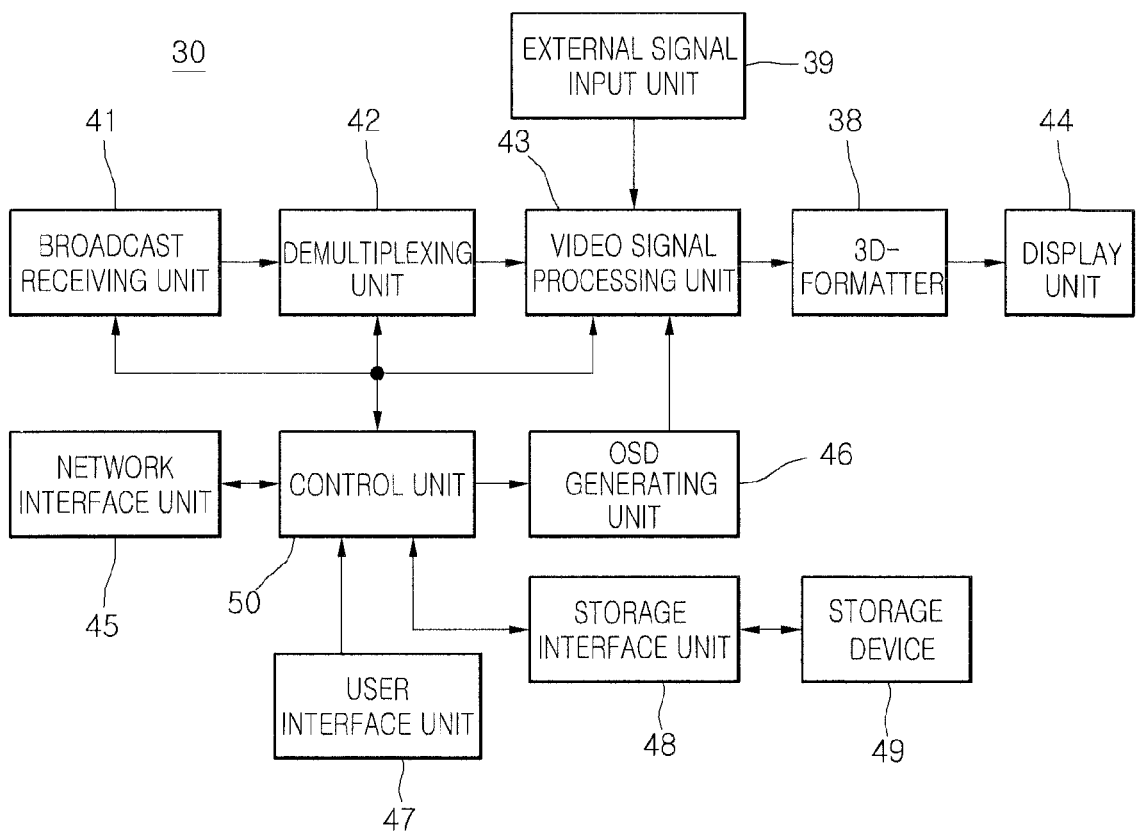
FIG. 3 shows an example of the network TV that generates a three-dimensional image.

FIG. 3 shows one embodiment of a broadcast receiving device that may be used to process a 3D-image. The operation of the components shown on FIG. 3 other than the 3D-formatter 38 is the same as that of FIG. 2. Referring to FIG. 3, the 3D-formatter 38 may be disposed at an output end of video signal processing unit 48. The 3D-formatter 38 may convert the image processed by the video signal processing unit into a 3D-image and may transmit it to display unit 44. According to one embodiment, a specific 3D-formatter that converts an OSD output into 3D may be included in the OSD generating unit 46. Other techniques may also be used to process a 3D-image.

Figure 4:
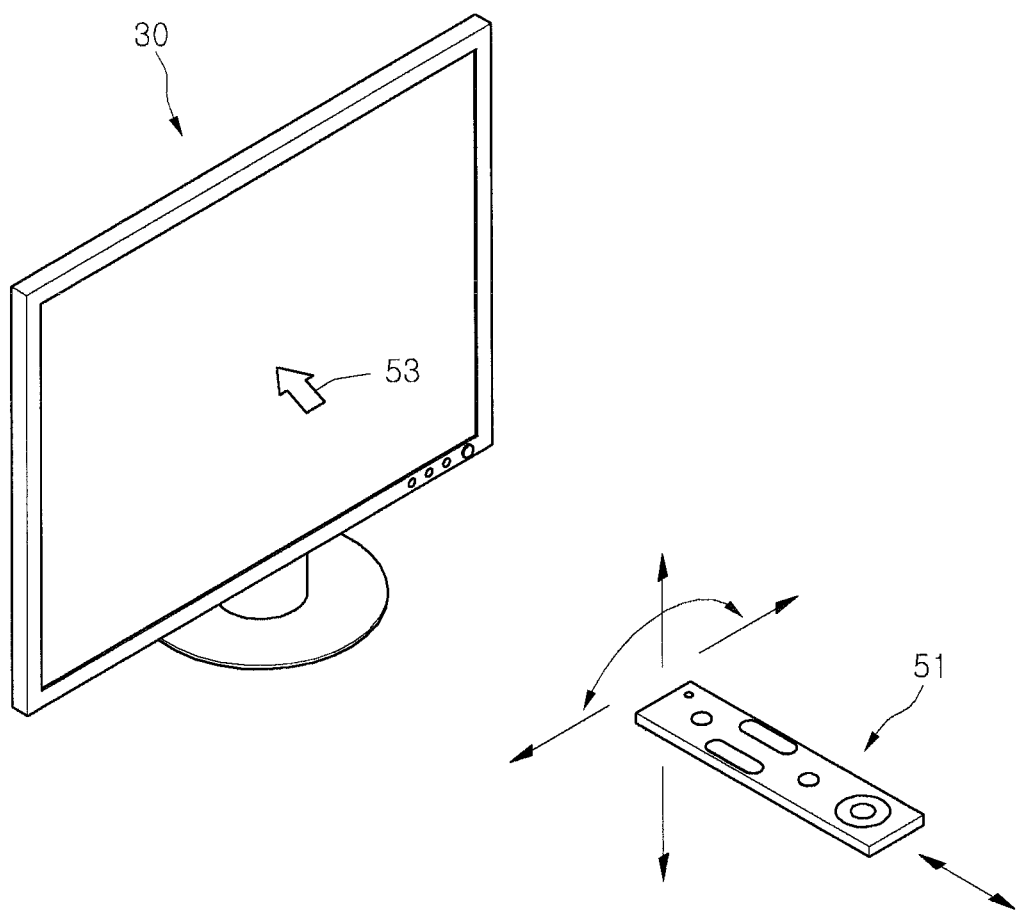
FIGS. 4 and 5 show an example of a remote controller or pointing device that controls the network TV shown in FIG. 2 or 3.
Figure 5:
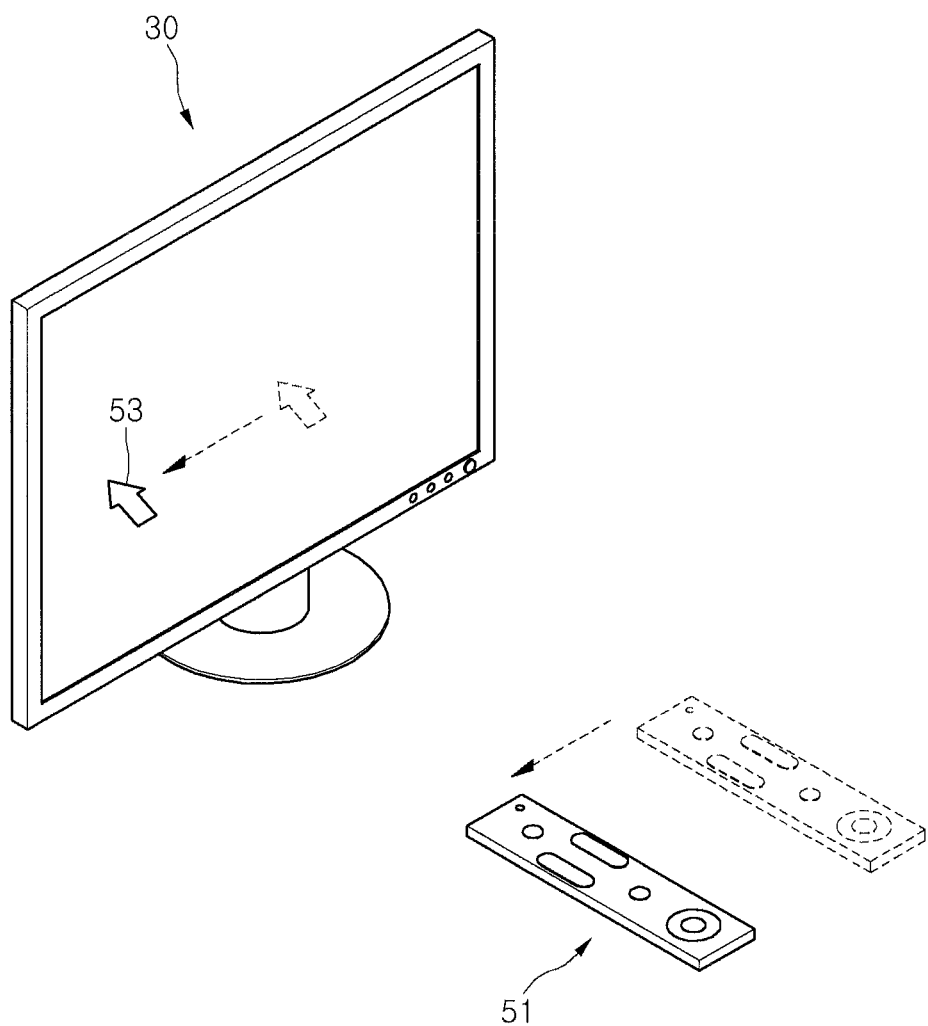

FIGS. 4 and 5 show examples of a remote controller for controlling the network TV 30 shown in FIG. 2 or FIG. 3. The remote controller may transmit a control signal to control unit 50 through a wireless signal receiver that may be included in user interface unit 47 of the network TV 30 and receive wireless signals, such as an RF signal or an infrared signal. The remote controller described with reference to FIGS. 4 to 5 may be a remote controller that responds not only to a selection of a button by a user but also to a user's gesture, hereafter referred to as a motion recognition remote controller 51.

According to one embodiment, the motion recognition remote controller 51 may transmit/receive a signal to/from the network TV 30 in accordance with an RF communication regulation. As shown in FIG. 4, a pointer 53 may be displayed at a position pointed by the motion recognition remote controller 51 on the network TV 30.

A user may move or rotate the motion recognition remote controller 51 up/down, left/right, and forward/backward. The pointer displayed on the network TV 30 may respond to the movement of the motion recognition remote controller 51. FIG. 5 shows how a pointer displayed on the network TV 30 may move in response to the movement of the motion recognition remote controller 51. As shown in FIG. 5, when a user moves motion recognition remote controller 51 to the left, the pointer displayed on the network TV 30 also moves to the left.

In this embodiment, the motion recognition remote controller 51 may have a sensor that recognizes movement. Information on movement of the motion recognition remote controller 51 which has been detected by the sensor of the motion recognition remote controller 51 is transmitted to the network TV 30. The network TV 30 may determine movement of the motion recognition remote controller 51 on the basis of the information on the movement of the motion recognition remote controller 51 and may calculate corresponding coordinates of pointer 53. An acceleration sensor, a gyrosensor, a geomagnetic sensor, or other appropriate sensors may be used to recognize the movement.

FIGS. 4 and 5 show an embodiment in which the pointer moves in response to up/down and left/right movement or rotation of the motion recognition remote controller 51. The movement velocity or direction of the pointer 53 may correspond to the movement velocity or direction of the motion recognition remote controller 51.

In this embodiment, a pointer 53 displayed on the network TV 30 may move in response to motion of the remote controller 51. According to one example, a predetermined instruction may be input to the TV in response to motion of the remote controller 51. For example, when the motion recognition remote controller 51 moves forward or backward, the size of an image displayed on the network TV 30 may be increased or decreased accordingly.

Figure 6:
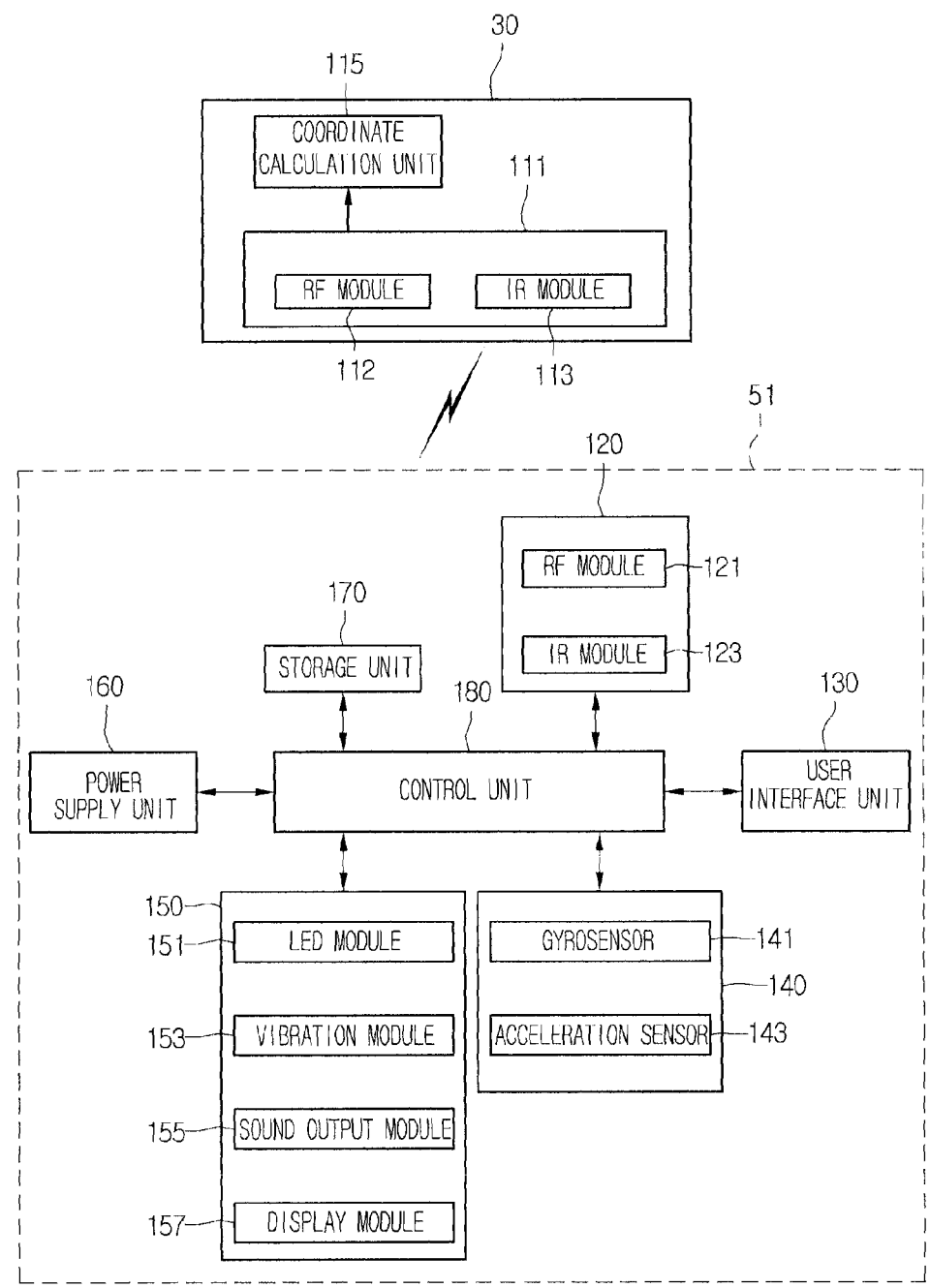
FIG. 6 shows one embodiment of the internal structure of an interface unit of the network TV shown in FIG. 1 and a motion recognition remote controller included for the network TV in FIG. 3.

FIG. 6 shows one embodiment of interface unit 47 of the network TV 30 of FIG. 1 and motion recognition remote controller 51 of FIG. 4. As shown, the network TV 30 may include a coordinate calculation unit 115 and a wireless communication unit 111. The coordinate calculation unit 115 may be included in the control unit 50. The wireless communication unit 111 may be included in the user interface unit 47. The wireless communication unit 111 may include an RF module 112 or an IR module 113. The motion recognition remote controller 51 may include a wireless communication unit 120, a user input interface unit 130, a sensor unit 140, an output unit 150, a power supply unit 160, a memory 170, and a control unit 180.

The wireless communication unit 120 transmits/receives a signal to/from the network TV 30. The motion recognition remote controller 51 may have an RF module 121 that may transmit/receive a signal to/from the interface unit 47 of the network TV 30 under the RF communication regulation. Further, the motion recognition remote controller 51 may have an IR module 123 that may transmit/receive a signal to/from the user interface unit 47 of the network TV 30 under the IR communication regulation.

The motion recognition remote controller 51 may transmit a signal carrying information on motion of motion recognition remote controller 51 to the network TV 30, using RF module 121. Further, the motion recognition remote controller 51 may receive a signal transmitted from the network TV 30, using the RF module 121. Further, the motion recognition remote controller 51 may transmit, if needed, an instruction for power-on/off, a channel change, a volume change, etc. to the network TV 30 using the IR module 123.

The user interface unit 130 may include a key pad or buttons. A user may input an instruction relating to the network TV 30, using the motion recognition remote controller 51, by operating the user interface unit 130. When the user input unit has a hard key button, a user may input an instruction relating to the network TV 30, using motion recognition remote controller 51, by pressing the hard key button.

When the user interface unit 130 has a touch screen, a user may input an instruction relating to the network TV 30, using motion recognition remote controller 51, by touching the soft key of the touch screen. Further, the user interface unit 130 may have a variety of input devices that a user may operate such as a scroll or jog key or other input devices.

The sensor unit 140 may include a gyrosensor 141 or acceleration sensor 143 to sense motion. The gyrosensor may detect movement of the motion recognition remote controller 51. For example, the gyrosensor 141 may sense information related to movement of the motion recognition remote controller 51 about the x, y, and z axes. The acceleration sensor 143 may sense, for example, information related to movement velocity of the motion recognition remote controller 51. The output unit 150 may output an image or voice signal corresponding to an operation of the user interface unit 130 or a signal transmitted from the TV 30. A user may recognize whether the interface unit 130 is operated or TV 30 is controlled from output unit 150.

For example, the output unit 150 may include one or more of an LED module 151 that is turned on/off, a vibration module 153, a voice output module 155, or a display module 157 that outputs video. The output unit 150 may be activated when the user input unit 130 is operated or when the network TV 30 transmits/receives a signal to/from wireless communication unit 120.

The power supply unit 160 may supply power to motion recognition remote controller 51. The power supply unit 160 may reduce the waste of power by disconnecting power when the motion recognition remote controller 51 has not moved for a predetermined period of time. The power supply unit may start again to supply power when a predetermined key of the motion recognition remote controller 51 is operated.

The memory 170 may store various types of application data for operating or controlling motion recognition remote controller 51. The motion recognition remote controller 51 may transmit/receive a wireless signal in a predetermined frequency band to/from the network TV 30 using the RF module 121. The control unit 180 of the motion recognition remote controller 51 may store in memory 170 information related to the frequency band of the wireless signal between the network TV 30 and the paired motion recognition remote controller 51. The control unit 180 of the remote controller may transmit a signal corresponding to the operation of a predetermined key of user input unit 130 or a signal corresponding to operation of the remote controller sensed by sensor unit 140 to the wireless communication unit 111 of the TV using wireless communication unit 120.

The network TV 30 may include a wireless communication unit 111 that transmits/receives a wireless signal to/from the motion recognition remote controller 51 and the coordinate calculation unit 115 that calculates coordinates of the pointer 53 which corresponds to a position of the motion recognition remote controller 51. The wireless communication unit 111 may transmit/receive a wireless signal to/from the motion recognition remote controller 51 using the RF module 112. Further, it may receive a signal transmitted from the motion recognition remote controller 51, using the RF module 112, under the IR regulation. The coordinate calculation unit 115 may calculate coordinates (x,y) of the pointer 53 that will be displayed on the display 49, after correcting for hand tremble or other errors, on the basis of a signal corresponding to motion of the motion recognition remote controller 51 which has been received through the wireless communication unit 111.

Further, the signal transmitted from the motion recognition remote controller 51 to the network TV 30 through the interface unit 47 may be transmitted to the control unit 50 of the network TV 30. The control unit 50 may recognize information regarding key operation and motion of the motion recognition remote controller 51 on the basis of the signal transmitted from the motion recognition remote controller 51. The control unit 50 may control the network TV 30 on the basis of the recognized result.

A menu screen of the network TV 30 and a method of operating the menu screen is described hereinbelow. According to one embodiment, the 'menu screen' of the network TV 30 may be an initial screen or a main screen when the network TV 30 enters an operation mode that provides a menu allowing the network TV 30 to select and connect with one of a plurality of content providers 20. The menu screen may include a plurality of icons representing a plurality of content providers 20, and may also include a background image having a specific subject. Simply for ease of explanation, the embodiments will be described hereinafter with the operation mode being a NetCast™ mode.

Figure 7:
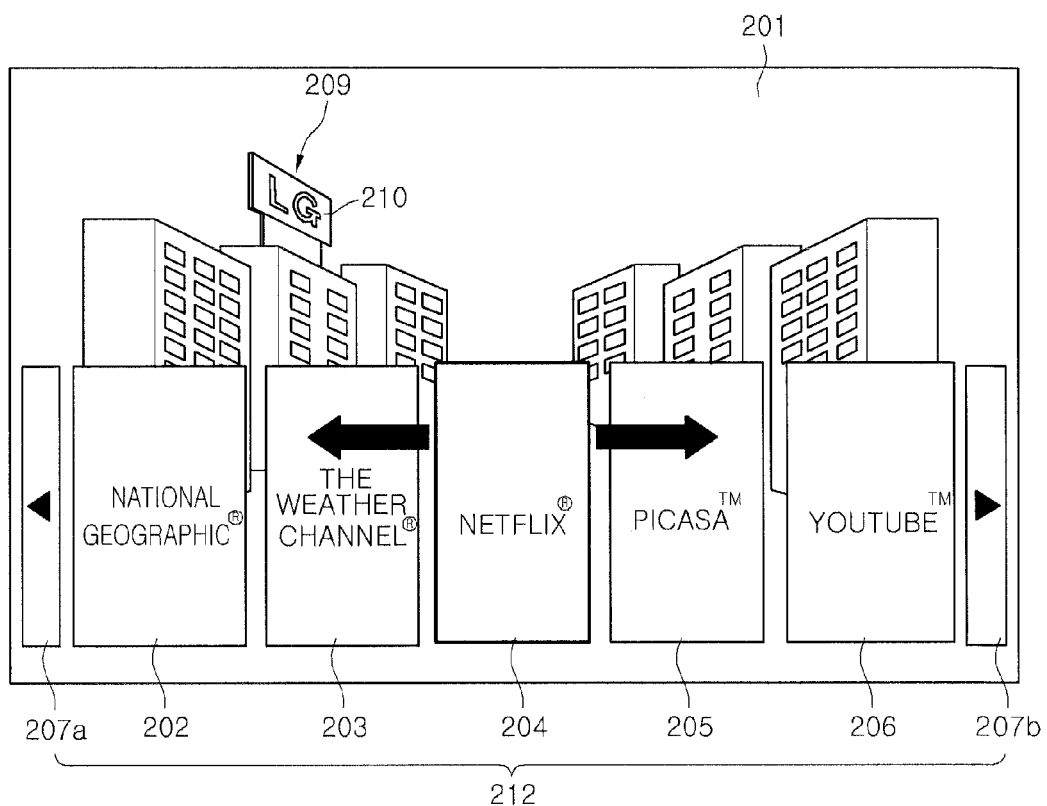
FIG. 7 shows one embodiment of a menu screen displayed on the network TV.

FIG. 7 shows an example of a menu screen 200 which may be generated on the network TV 30. In this example, an image of a city is shown as the background image 201 of the menu screen 200 and a plurality of icons 212 representing content providers 20 are shown over the main screen. The image of the menu screen may include any type of theme, location, specific subject, or other features or any combination thereof, including but not limited to various subjects such as a jungle, department store, beach, universe, and/or scene of fairy tales. The background image 201 may also include graphical objects that may be displayed, for example, by selectively inserting a basic and/or other images corresponding to a subject. The icons 212 may correspond to one or more buttons for connecting with a respective number of content providers 20, and a user may access one or more desired services from a content provider 20 by selecting one of the icons 212.

Additionally, the icons 212 may relate to the background image 201. According to one example, the icons 212 may be graphical objects corresponding to a subject or other feature in the background image. For example, icons 212 may be displayed in a shape of a structure or a billboard on a road of a city. The images displayed on the icons may be provided by one or more of the content providers 20 and/or based on information stored within the network TV 30 or other external sources. A user may use motion recognition remote controller 51 to select the icons 212.

When background image 201 (e.g., an image of a location or area) is changed based on, for example, user information, the icons 212 and/or the images displayed on the icons 212 may be changed accordingly. For example, the content providers 20 corresponding to the icons 212 may include or contain National Geographic® 202, The Weather Channel® 203, Netflix® 204, Picasa™ 205, and YouTube™ 206, as shown in FIG. 7. The images displayed on each icon may represent each respective content provider 20. Moreover, the National Geographic® provider may provide science content, The Weather Channel® 203 may provide weather information corresponding to a specific area, Netflix® may provide movie content, Picasa™ may provide photographs or other related content, and the YouTube™ may provide VOD content.

According to one embodiment, various types and/or numbers of icons may be additionally displayed on the menu screen. Scroll bars 207a and 207b may be disposed at left and right sides of the icons 212 to allow additional icons to be displayed when a user selects the scroll bars.

According to another embodiment, an image display region 209 where another image may be displayed may be defined at a portion of the background image such that it is possible to display other images showing an advertisement image 210 or a message in the image display region 209. The advertisement image 210 may include an advertisement and/or other image that may include predetermined information corresponding to a guide message. The advertisement information 210 or other images may be provided by the network operator and/or the content providers 20.

According to another embodiment, the image display region 209 may be disposed at a predetermined position of background image 201, and may also be disposed at an appropriate position in consideration of a subject or other feature in the background image 201. For example, as shown in FIG. 7, image display region 209 may be disposed at an outdoor sign board position, for example, a billboard, and an advertisement image 210 may be displayed.

The image display region 209 may have various shapes in accordance with the subject or other features in the background image 201. For example, when the subject of the background image 201 is a park, the image display region 209 may show a pond or a tree that is commonly seen in a park, or when the subject of the background image 201 is a department store, the image display region 209 may be a display window that is commonly seen at a department store.

As previously described, a message or advertisement 210 may displayed in a creative manner to engage the attention of a user. This may be accomplished, for example, by displaying an image in image display region 209 to be harmonized with the background image 201. Detailed and various methods of displaying a message or an advertisement in the image display region 209 are described below.

When a user selects one of the icons 212, for example, the Netflix® icon 204, the selected icon is highlighted so as to discriminate it from the other icons. The icon may be selected using an arrow or cursor on the screen that may be controlled by the motion recognition remote controller 51. When another icon is selected, the other icon may be highlighted and the previous icon deemphasized. With the icon selected, when a button of the remote controller is pressed, for example, the ENTER button, a connection may be established with the server of the content provider 20 corresponding to the selected icon and an initial or predetermined screen of the server of the content provider 20 may be displayed.

The number, size, position, and/or arrangement of icons displayed on one screen may vary in different applications or embodiments. The icons 212 may include or may be associated with a name or image to distinguish among the content providers 20. In addition, each network TV 30 may store in an internal memory device a number of built-in icons, images, or other features provided, for example, by the TV manufacturer. Additionally, network operator 10 may provide each network TV 30 with images, information, or other features that correspond to the icons 212 from one or more content providers 20. New images, information, of features may be transmitted to the network TV 30 in this manner or images, information, and features already stored in the TV 30 may be updated. Further, the network TV 30 may directly connect with the servers of the content providers 20 for receiving or downloading images.

Figure 8:
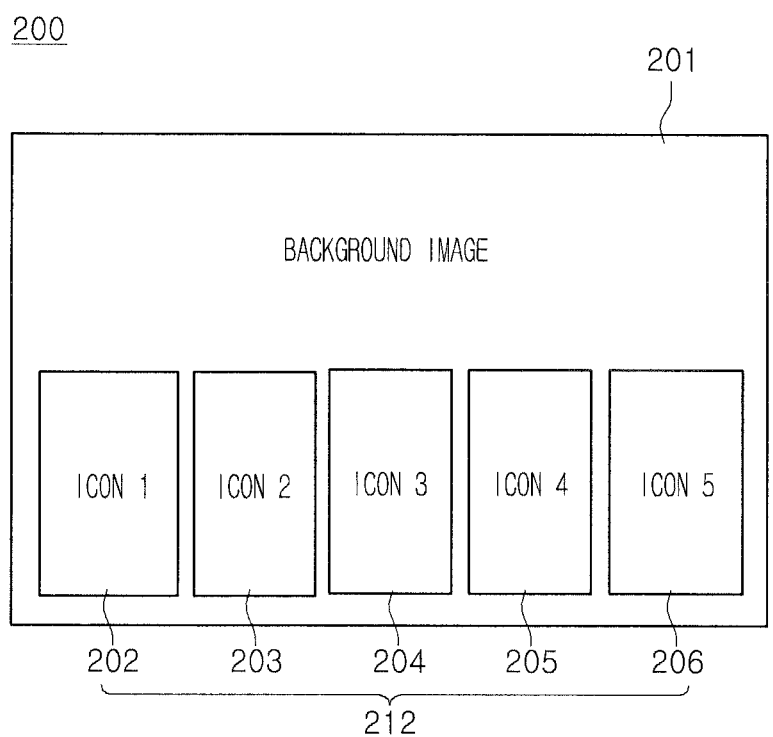

FIGS. 8 and 9 show examples of menu screens that include a background image 201 and icons 212. As shown in FIG. 9, one menu screen may include a number of icons 212 disposed over background image 201. The menu screen may be implemented by overlapping a layer 213 that includes the background image with a layer 213' that includes the icons 212.

According to one embodiment, different effects may be applied to or associated with layers 213 and 213'. For example, the icons 212 may be translucently displayed to allow, for example, all or a portion of the background image 201 to be visible through the icons 212. Alternatively, only the background image 201 may be translucently displayed to allow the icons 212 to be visible through the background image 201. Other effects including animations, movement of graphical or animated objects or features, or other visual and/or audible effects may be provided in association with the icons 212 and/or background image 201.

FIGS. 10 to 15 show additional examples of menu screens where various effects are applied to icons selected by a user. The effects may be performed when, for example, an icon is selected in the NetCast™ service or in another mode. One effect may involve displaying an image relating to a content provider 20 of one or more of the icons 212 (whether selected or not). The image may be one stored in the network TV 30 or in a unit coupled to the TV, and/or the image may be received through the network from a content provider 20. In the latter, the content provider 20 may control which image is to be displayed.

Another effect may be to display a video, animation, or a still image in association with the background image 201 and/or one or more of the icons 212. According to one embodiment, the content provider 20 may provide information needed to apply these effects directly to the network TV 30 or the effects may be made available from another manufacturer or party by request for direct or indirect transmission to the network TV 30 through the network operator 10 or other network entity.

Figure 10:
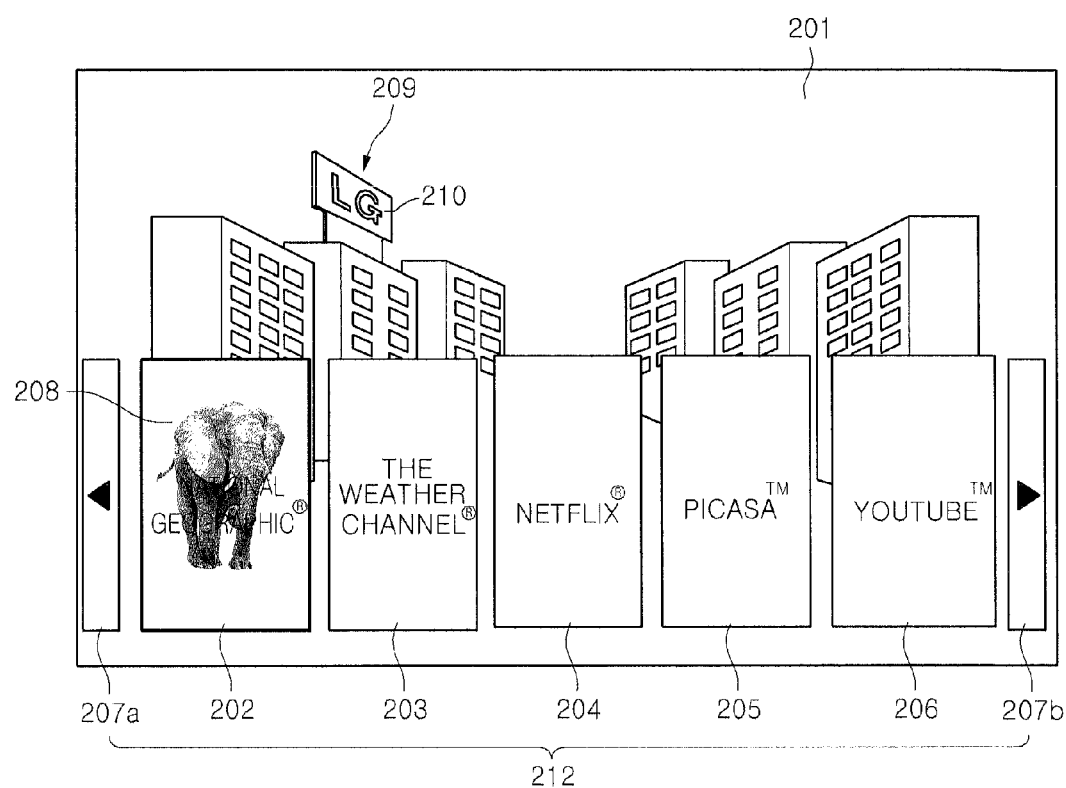
FIGS. 10 to 15 show various menu screens, background images, and/or effects generated in accordance with one or more embodiments herein.

Referring to FIG. 10, when a user selects the icon 202 corresponding to a national science provider, for example, National Geographic®, a video relating to subject matter associated with National Geographic® may be displayed in association with the national science icon 202 at another location. The video or another effect may be displayed while a current background image 201 and the images of the icons 212 are maintained.

For example, since the National Geographic® provides content relating to animals, when the National Geographic® icon 202 is selected, a video showing an animal 208 (e.g., an elephant walking in relation to one or more of the icons) may be displayed. Alternatively, a video showing an eagle flying in the sky in the background image or a video showing a variety of animals coming out from one side of the screen may be displayed. The video effects may be implemented using, for example, a flash program or other appropriate application programs.

The videos may relate to content providers 20 represented by icons 212 and may be controlled by the content providers 20. For example, content may be created by the content providers 20 or manufacturer, and by request may be transmitted through network operator 10 or directly to the network TV 30 for storage therein.

In accordance with another embodiment, a video that contains an animal moving in front of or around structures of a city in the background image 201 or icons 212 may be displayed. This may be an animation associated with the content provider 20. This effect may allow a user to acquire intuitive information on selected icons while providing fun and interesting viewing.

When a user presses a specific button of the motion recognition remote controller 51 (e.g., the ENTER button or the like) while a video is being played, a connection may be established with a server of the content provider 20 of National Geographic®. Through this connection, an initial or other predetermined screen of a service corresponding to National Geographic® may be displayed on the network TV 30. Thereafter, the user may be provided with content by selecting the content provided by National Geographic® on the screen.

The videos may be in a format that may be executed by the network TV 30 as provided by content provider 20 on the basis of, for example, system information or software of the network TV 30. This system information or software may be provided by the manufacturer of the network TV 30, either at the time of manufacture or during a download operation. The network TV 30 manufacturer may provide a user with a product having the software of the network TV 30 including the corresponding video such that the video may be played. According to another embodiment, the network TV 30 manufacturer may create a video and include it in the software of the network TV 30.

According to one embodiment, in the network system of FIG. 1, each content provider 20 may create a video and transmit it to network operator 10 after receiving system information of the network TV 30 from the network operator 10 or the network TV 30 manufacturer. The network operator 10 may transmit an updated file including the video file to the network TV 30 that may display the video as described above by executing the updated file. The displayed video may also be updated by the above method.

Further, according to an embodiment, an image that is displayed when an icon 202 is selected may be changed in accordance with a time of day or a season of the year. Further, when a content provider 20 provides new content, it may be possible to display a video relating to the newly provided content. The video relating to the new content may be displayed by updating the video in the above method. Even if new content is not provided, a user may be permitted to use the NetCast™ service to periodically update the video.

Figure 11:
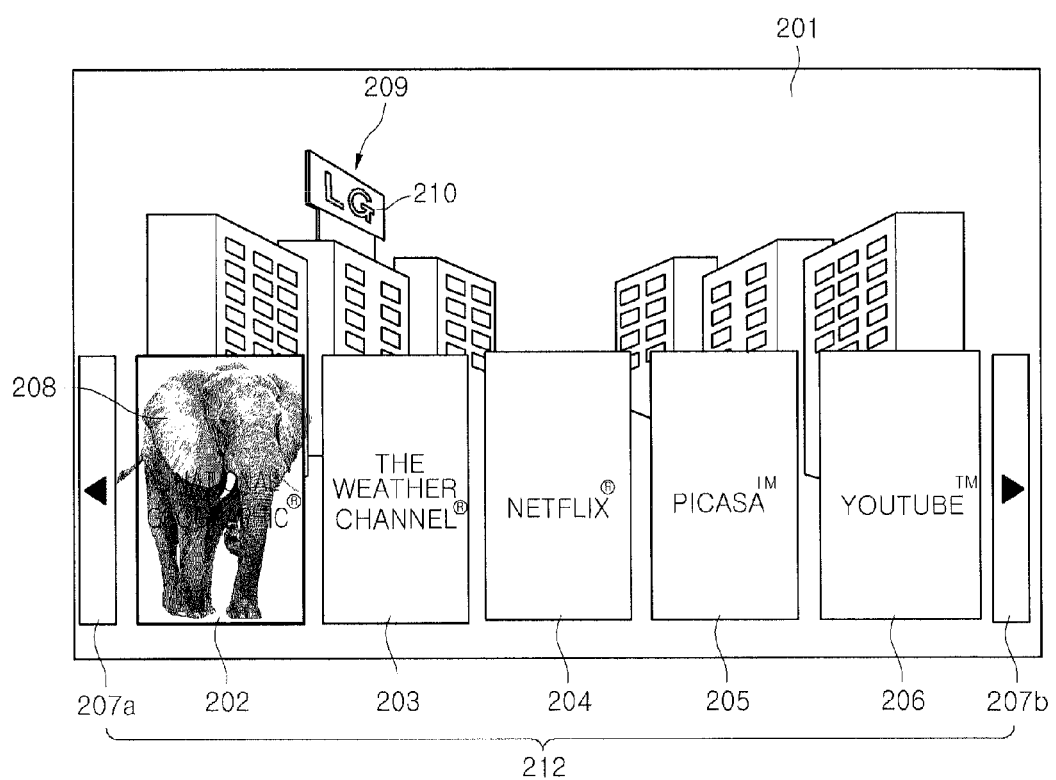

Further, according to an embodiment, it may be possible to display a three-dimensional image when an icon 202 is selected. For example, when the National Geographic® icon 202 is selected in FIG. 10, it is possible to provide an effect as if the elephant 208 is walking toward a user, as shown in FIG. 11. In this embodiment the icons or background image may be implemented in a 3D-image.

Figure 12:
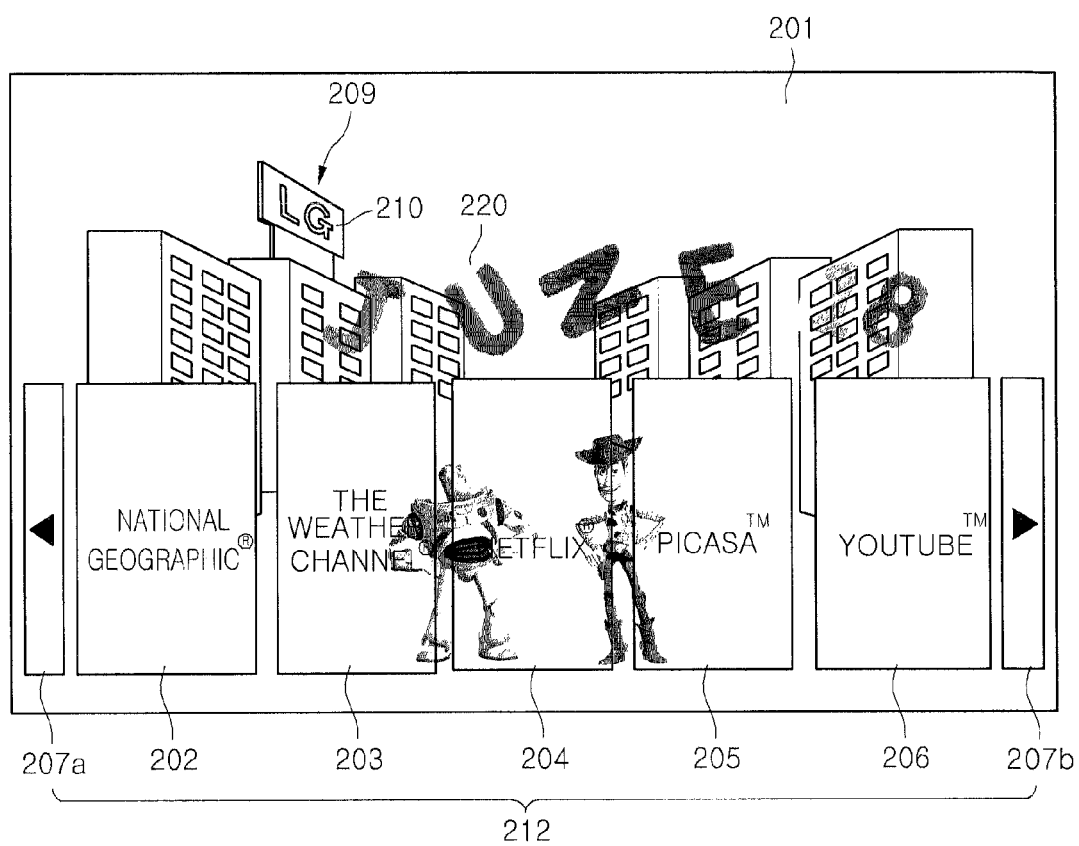

Referring to FIG. 12, according to one embodiment, when a user selects a content provider 20 which provides movie content (for example, icon 204 of Netflix®), a video relating to content provided by Netflix® may be displayed. The displayed video may relate to or be displayed in association with the background image 201 or icons 212. That is, one or more subjects or features in the video may be displayed in a way that makes it appear as if the subjects or features are moving within the environment of the city provided in the background image 201 and the icons 212.

For example, as shown in FIG. 12, it may be possible to display a video of the characters of the movie Toy Story. Further, according to one embodiment, the video may be made to display specific information. For example, assuming that Netflix® plans to provide service for the movie Toy Story on a specific date, for example, June 18, it is possible to display a video in which the characters throw up letters "J", "U", "N", "E", "1", and "8" 220, one by one, over the structures, signs, or billboards relating to the icons 212. In this configuration, a user may recognize that the selected icon provides movie content and may be entertained while the content provider 20 advertises specific content. The video shown in FIG. 12 may be displayed by an animation implemented by a flash program and updated by the method described above. Further, the video of FIG. 12 may also be implemented and displayed in a 3D-image.

Similar to the embodiment shown in FIG. 10, when a user presses a specific button of the motion recognition remote controller 51, for example, an OK button while a video is displayed, it may be possible to display the initial screen by connecting with the Netflix® server. When another button (for example, a cancel button) is pressed, the displayed video may be stopped. It is possible to display information on the displayed video, that is, Toy Story, on the initial screen provided when connecting with the Netflix® server.

Figure 13:
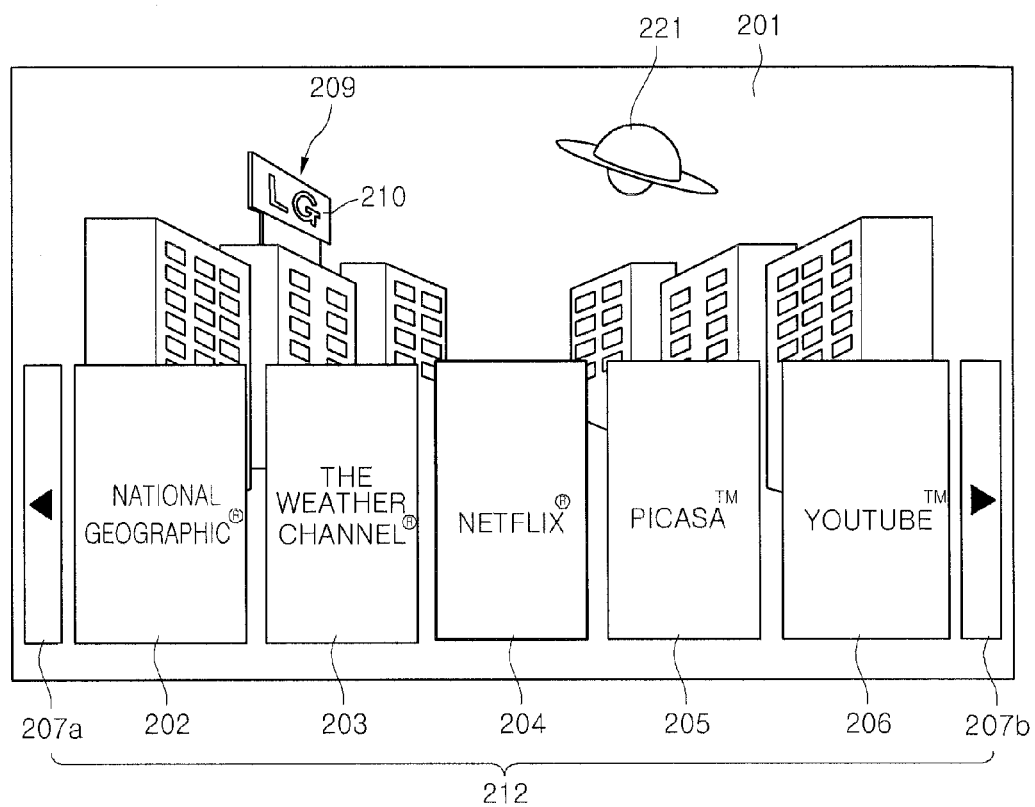

Referring to FIG. 13, when a user selects icon 204 for a content provider 20 of movies, for example, NetFlix®, it may be possible to display a video in which an object in a predetermined movie, for example, a spaceship 221 of Star Wars flies in the sky of the city background image 201. When the user presses a specific button while the spaceship 221 flies, it may be possible to connect with the Netflix® server to display an initial screen of Netflix®. It may be possible to display detailed information related to the displayed video, for example, the movie relating to the spaceship 221 or an advertisement video (e.g. a trailer), on the initial screen of the Netflix®. Further, the price of the content of Star Wars may be displayed during or after the advertisement video is played, and it may be possible to download or stream the movie Star Wars to the network TV 30 if the user purchases the content.

Figure 14:
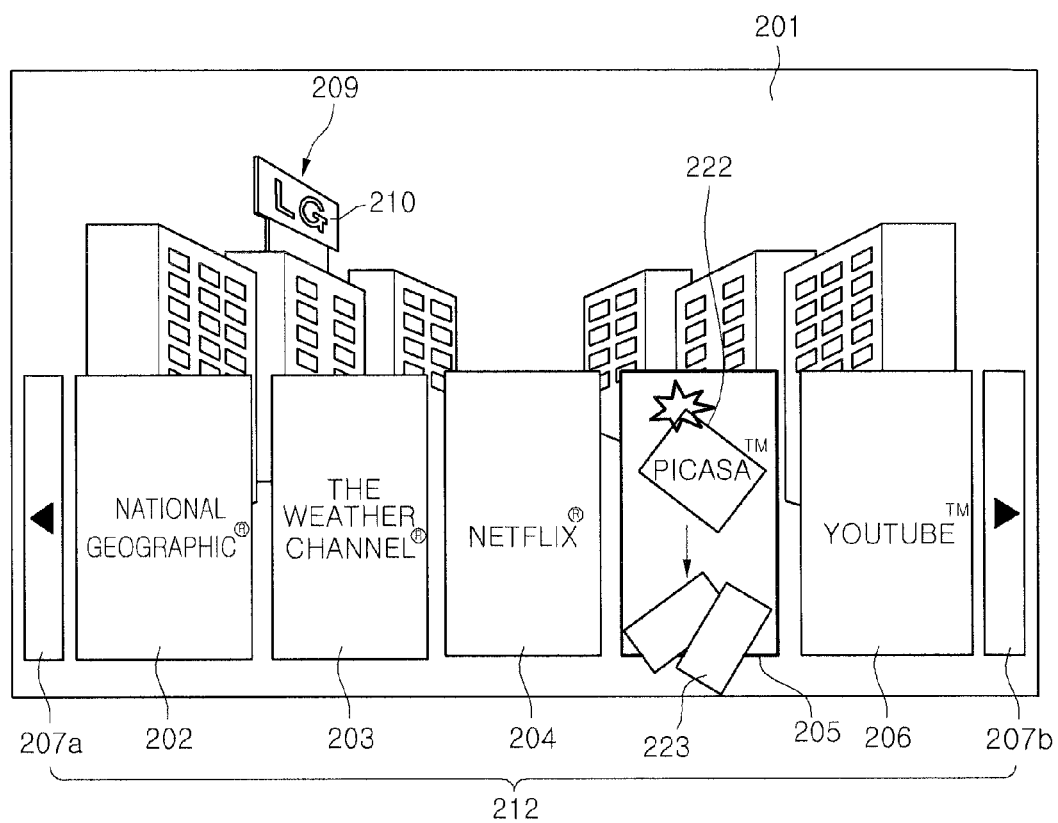

Referring to FIG. 14, when a user selects the provider of photograph content, for example, the Picasa™ icon 205, a video relating to photographs may be displayed. Similar to the embodiment described above, the displayed video or other effect may be activated in relation to the background image 201 or the icons 212 in the main screen.

For example, when a user selects Picasa™ icon 205, a sound of a shutter when taking a photograph may be output with a photograph frame 222 displayed in or around icon 205. In addition, or alternatively, an effect may be performed in which a photograph appears to fall down and is stacked with other photographs at a lower end 223 or in front of the icons. Similarly, when the user presses the OK button in the above state, a connection may be established with the Picasa™ server and an initial or predetermined screen of Picasa™ may be displayed.

Figure 15:
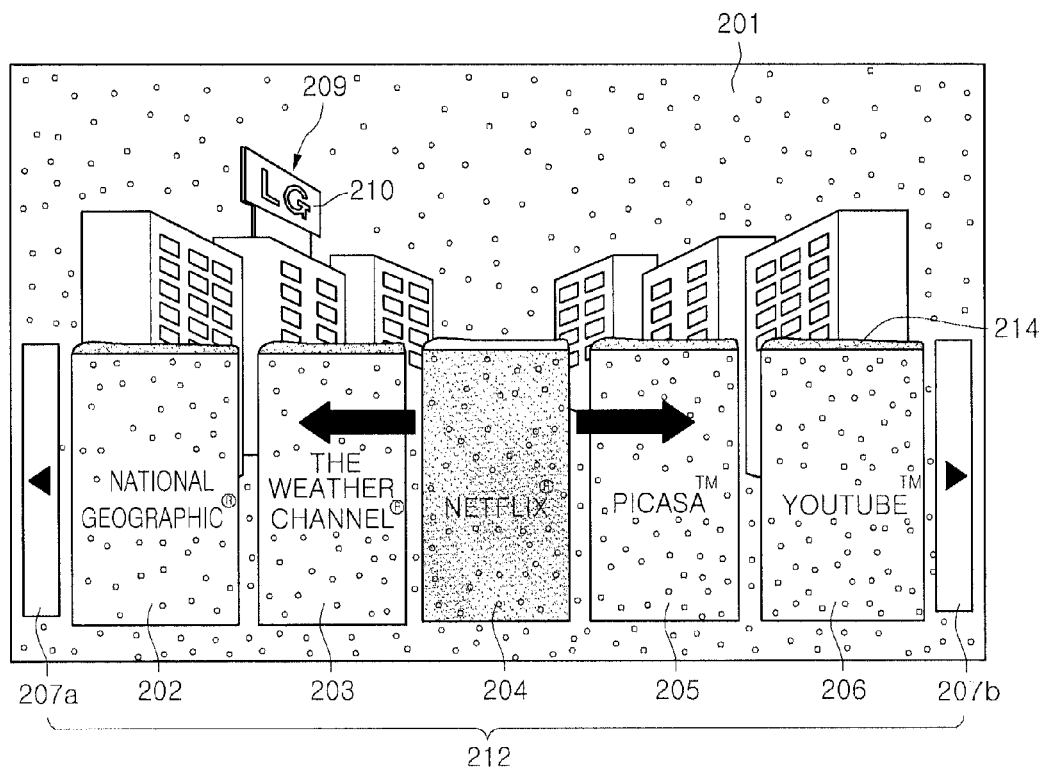

FIG. 15 shows an example of displaying a video or effect relating to weather over a background image 201 when a user selects an icon 203 corresponding to a weather information content provider 20. The effect may involve, for example, snow falling down over the city background image 201 and/or icons 212 in the menu screen. When icon 203 is selected, weather information may be received on the area where the network TV 30 is currently located. An effect corresponding to this weather information may then be displayed in the city included in background image 201. For example, an image where a sun is high in the sky may be displayed over the background image 201 when current or forecasted weather conditions are clear for the geographic area in which the network TV 30 is located. Alternatively, the screen may be darkened or a cloud image may be displayed when the weather conditions are cloudy, or an image showing rain may be displayed when rainy weather conditions are forecasted or exists. Also, an image showing snow may be displayed when snow is falling or is forecasted.

The weather information depends on the area information of the network TV 30, that is, the position or location of the network TV 30. The weather information content provider 20 may have all the weather information for the service area. After receiving the position information of the network TV 30, the weather information content provider 20 may transmit weather codes corresponding to the information to the network TV 30. The network TV 30 may store a video corresponding to each weather code, and load and display a video corresponding to the weather code received from the weather information content provider 20 when a user selects The Weather Channel® icon 203.

Figure 16:
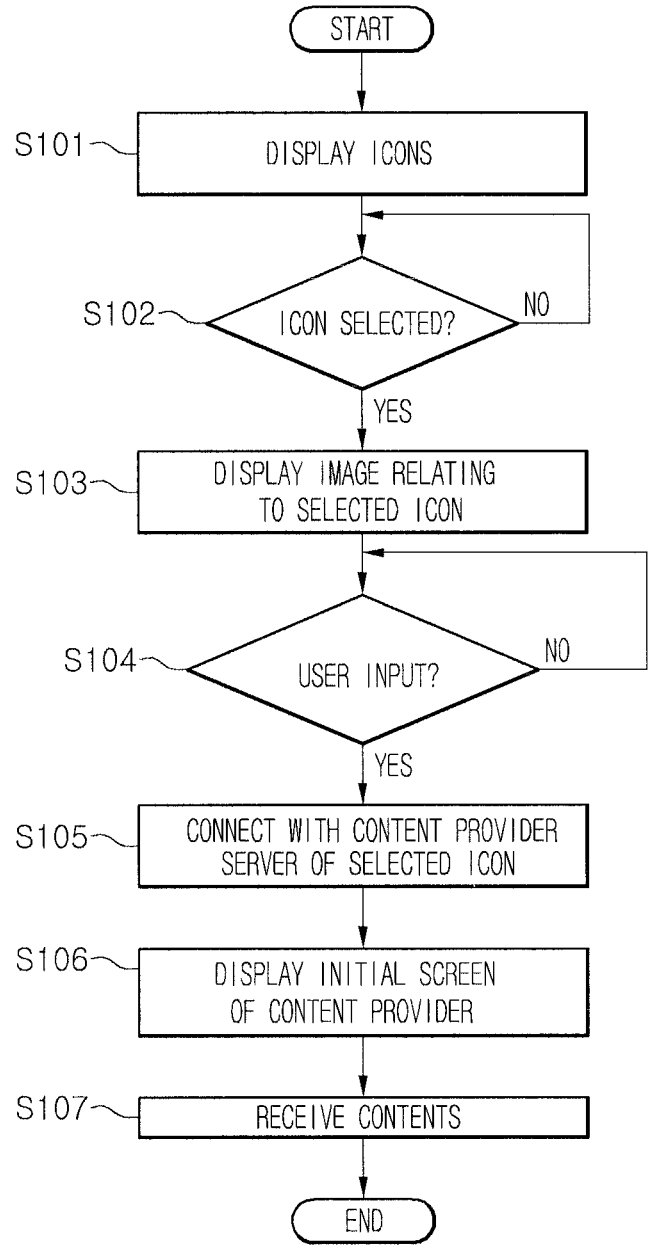
FIG. 16 is a flowchart of a method for displaying media information in accordance with one or more embodiments described herein.

FIG. 16 shows operations included in one embodiment of a method for displaying a video in accordance with a selected icon in a menu screen including background image 201 and icons 212.

In step S101, a menu screen including icons representing content providers 20 is displayed. The background image may be displayed with the icons.

In step S102, a selection of one of the icons by a user is detected.

In step S103, an image relating to the icon selected by the user is displayed. The image may be displayed while the background image and the icons are still displayed. The image may be a video, an animation, or still image, and may relate to the content provider 20 represented by the selected icon. For example, as described with reference to FIGS. 10 to 15, the image may be a video that relates to the icon or the corresponding content provider 20, and may be provided and controlled by the corresponding contents provider 20.

In step S104, when there is a user input while the image is displayed, in step S105, a connection with the server of the content provider 20 of the selected icon may be established. When there is no user input, the image may be kept repeatedly displayed, or a plurality of different videos may be sequentially displayed.

In step S106, the initial screen of the content provider 20, for example, a homepage of the server, is displayed, and in step S107, content is provided in accordance with the service that is usually provided by the network TV 30.

Meanwhile, according to one embodiment, an image including a message or an advertisement may be displayed on the menu screen of the network TV 30, regardless of a user input. The message may be an advertisement image of other images provided by the network operator 10 or contents provider 20.

As described above, background image 201 of the menu screen of the network TV 30 may include an image display region where an image may be displayed, and the image display region may be disposed at a predetermined fixed position or moved to other positions. A fixed-type display region may be disposed at a fixed position on the background image 201. For example, image display region 209 of FIG. 7 is set as a fixed type and an image such as an advertisement or other information may be selectively displayed in the image display region. The displayed message or advertisement 210 may be changed or updated by content provider 20 or network operator 10.

In another application, a movable image display region may move on or be adjusted relative to the background image. The image may not normally be displayed at this location on the menu screen, but may be displayed at this location on the menu screen by generating an interrupt in the control unit 50 of the network TV 30.

Figure 17:
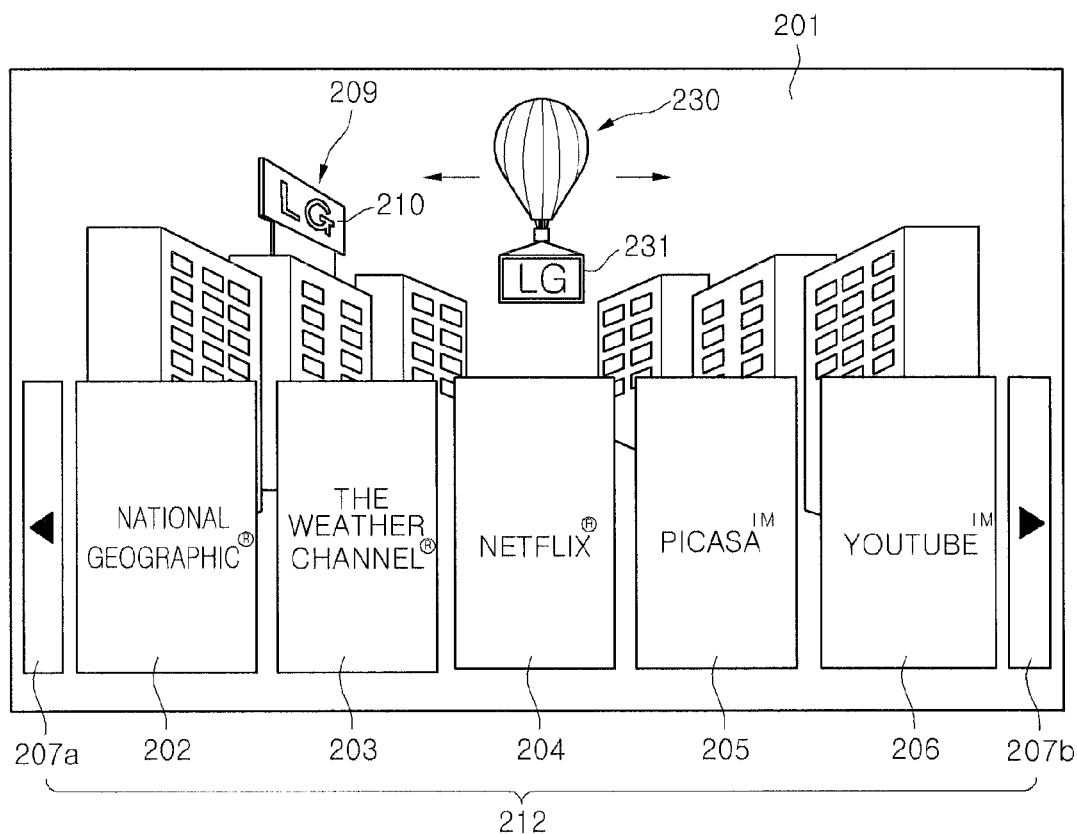
FIGS. 17 to 20 show screens that include various types of messages or advertisement images that may be generated in accordance with one or more embodiments described herein.

FIGS. 17 to 20 show additional menu screens that include a message or advertisement, displayed at a fixed or movable display region on a background image 201. Referring to FIG. 17, after a predetermined period of time passes with the menu screen displayed, a predetermined message or advertisement may be displayed on the menu screen, regardless of whether a user selects an icon 212. The image may be displayed in the movable image display region 230. Preferably, the image display region may relate to the subject of the background image. For example, when the subject of a background image 201 is a city as shown in FIG. 17, an image display region with a hot air balloon 230 flying in the sky may be used. The hot air balloon 230 may have a box 231 and the box may correspond to the image display region where a predetermined message or advertisement is displayed.

The image representing the movable image display region, that is, the hot air balloon 230 and box 231, may be provided by the network operator 10 and a message or an advertisement image that will be displayed in the movable image display region may be provided by network operator 10 or content provider 20. When an advertisement is displayed, the advertiser may be the content provider 20, manufacturer or any other appropriate advertiser. When an advertisement image is displayed in the movable image display region, the advertisement may include an advertisement expression or the company logo. The movable image display region may be implemented by an animation, using, for example, a flash program. The above configuration may be effectively used when network operator 10 or an advertiser wants to display a message or an advertisement to a user.

When the hot air balloon 230 is selected, detailed information relating to a corresponding message may be displayed, the home page of the advertiser may be connected to and displayed, and/or an advertisement provided by a corresponding advertiser may be displayed as the hot air balloon 230 flies across the screen. The hot air balloon 230 may be selected using, for example, a motion recognition remote controller 51 or by pressing a specific button, for example, the ENTER button or any other appropriate button.

Figure 20:
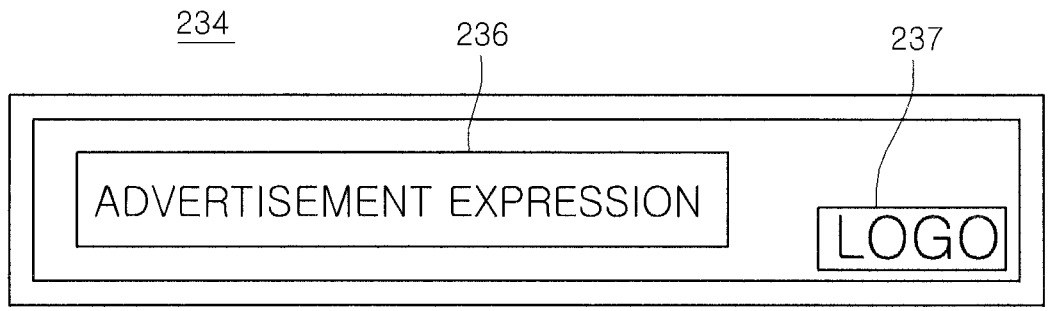

According to another embodiment, an advertisement image 210 may be displayed on an outdoor billboard or sign that is at a fixed location on the image display region 209 in FIG. 17. The advertisement image 210 may be provided by content provider 20 or network operator 10, and may be changed to fit image display region 209. As shown in FIG. 20, the image display region 209 may be tilted, for example, not facing towards the front of the screen as seen by a user to provide a perspective view. The network operator 10 or TV 30 may be provided with an advertisement expression from the content provider 20 or a predetermined advertiser. This expression may be appropriately formatted and transmitted to TV 30 to fit into image display region 209.

Figure 18:
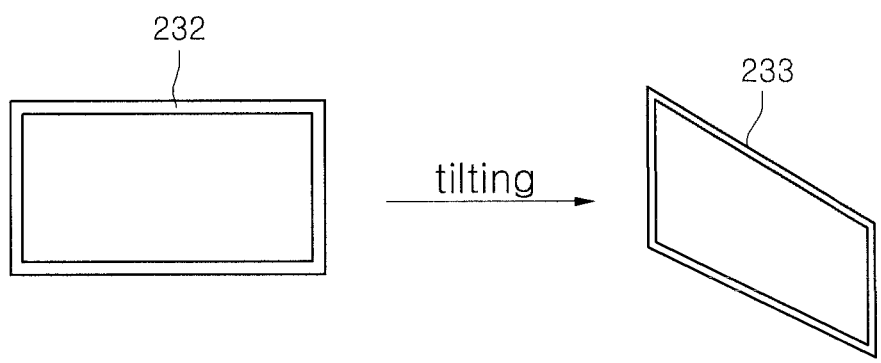

Referring to FIG. 18, the original image 232 provided by content provider 20 or network operator 10 may have a rectangular shape facing the front, whereas image 233 that will be displayed on the outdoor sign or billboard of FIG. 17 may be a tilted image that provides a perspective view. The image provided by the content provider 20 or the advertiser may be tilted, as shown in FIG. 18, and then transmitted to the network TV 30.

The fixed-type image display region and the movable image display region described above may be included in the background image 201. The background image 201 may, for example, be included in a firmware implementing the menu screen of the network TV 30, and the position, shape, and size, etc., of the image display region may be changed by updating the firmware.

Figure 19:
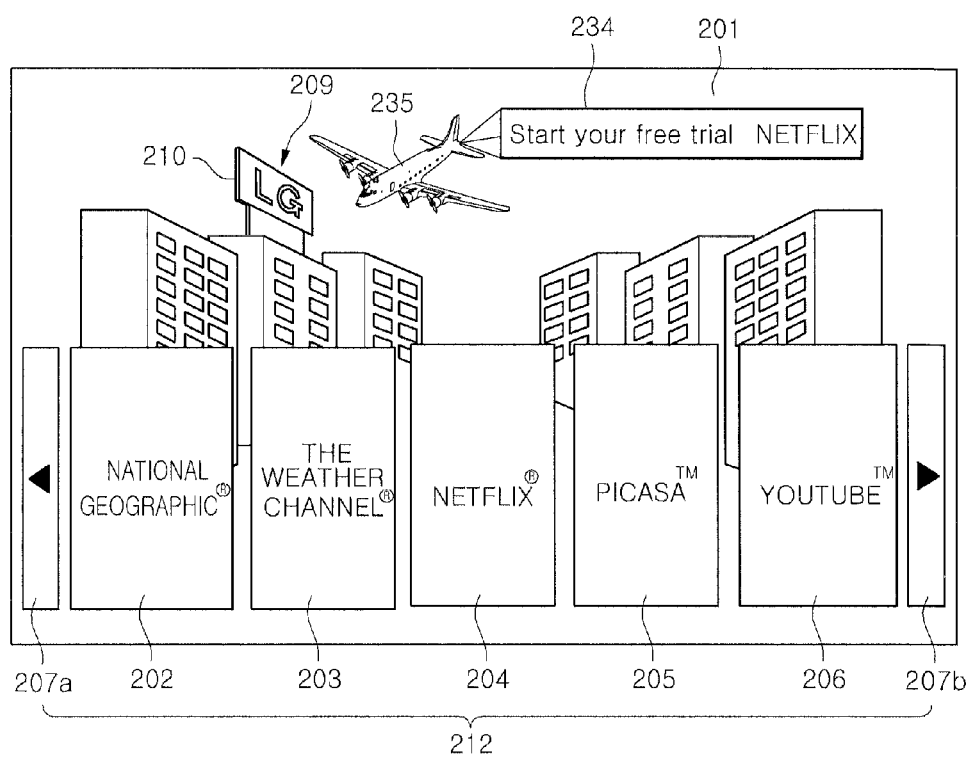

Referring to FIG. 19, according to one embodiment, after a predetermined time period passes with the menu screen displayed, it is possible to display a video of an airplane 235 with a banner 234 regardless of whether a user selects an icon 212. This is a type of a movable image display region. The video of the airplane 235 also relates to the city that is the subject of the background image 201 and displays the airplane 235 with the banner 234 flying in the sky. Any image or information may be displayed on the banner 234. When the airplane 235 is selected, for example, when a user presses a specific button such as, the ENTER button or a button corresponding thereto, additional detailed information related the message displayed on the image may be displayed, detailed information related the advertisement may be displayed, or the network TV 30 may connect with the advertiser's server.

According to one embodiment, as shown in FIG. 20, the banner 234 may include a plurality of lower display regions, for example, an advertisement expression slot 236 and a company logo slot 237. It may be possible to implement the image in which the airplane 235 with the banner 234 flies across the screen, as shown in FIG. 19, with a display of an advertisement expression and a company logo image provided by the advertiser in the advertisement expression slot 236 and the company logo slot 237. Airplane 235 and the banner 234 may be included in firmware of the network TV 30, and the position, shape, and size, etc., may be changed by updating the firmware of the network TV 30.

Figure 21:
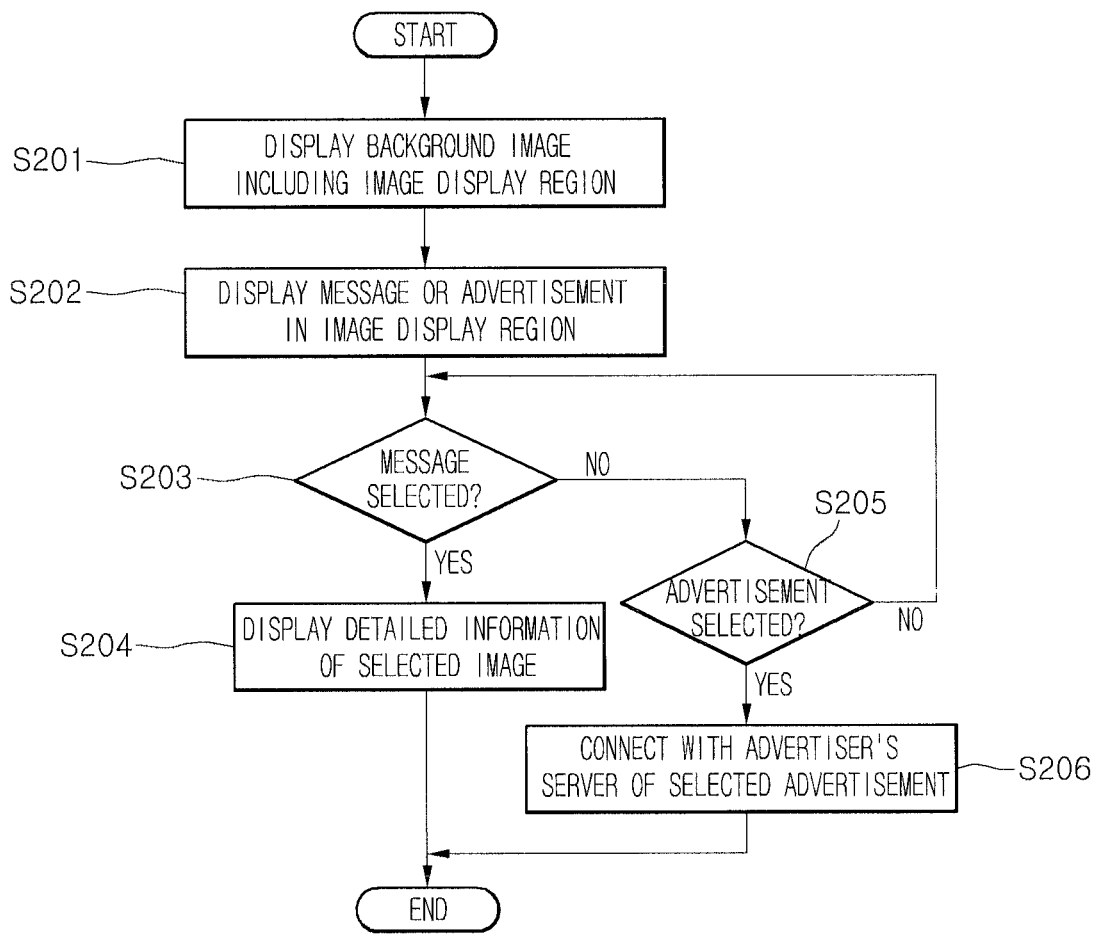
FIG. 21 is a flowchart of a method for displaying a message or advertisement image in accordance with one or more embodiments described herein.

FIG. 21 shows operations in one embodiment of a method for displaying an image or advertisement on a menu screen in or relative to a background image 201. In step S201, a background image including an image display region where a message or an advertisement image is displayed may be displayed. The message may be a predetermined message for providing a user with information and the advertisement image may include a predetermined image that may be used for an advertisement, such as, an advertisement expression or company logo.

In step S202, a message or an advertisement image may be displayed in the image display region. Steps S201 and S202 may be simultaneously performed. The message or the advertisement may be provided from the network operator or content provider 20 of FIG. 1 or a predetermined advertiser.

In step S203, it may be determined whether the displayed message has been selected. If the message is selected, the detailed information related to the selected message may be displayed, in step S204.

If a message was not selected, in step S203, it is determined whether an advertisement has been selected, in step S205. If it is determined that the advertisement has been selected, the server of the selected advertiser is connected, in step S206. When the advertiser is a content provider 20, content may be provided after connecting to the server of the advertiser.

The system stands by when the user does not select any one of the message or the advertisement. According to an embodiment, it may be possible to automatically change the message or advertisement displayed in the image display region each time after a predetermined time period has passed.

According to one embodiment, the menu screen may be composed of a plurality of layers, wherein one layer may display an image, and it may be possible to transmits and display the effect generated by displaying the image to another layer. That is, it is possible to transmit the effect generated by one of the plurality of layers to another layer. It may be possible to provide a user with an active, funny, and interesting menu screen by making a plurality of layers exchange effects with each other.

In the embodiment shown in FIG. 15, as a video about weather is executed, the background image and icons may consecutively exchange effects. That is, as described with reference to FIG. 9, the menu screen may be composed of the layer 213 including the background image 201 and the layer 213' including the icons 212. When a user selects icon 203 for weather information, an image in which it is snowing may be first displayed on the layer 213 that includes the background image 201. It may then be possible to transmit the effect generated on layer 213 to layer 213' that includes the icons 212. That is, it is possible to display an image 214 of snow being collected on the icons 212 as snow falls in the background image 201. This corresponds to an embodiment that may display an image on one of two different layers and transmits the effect generated by displaying the image to the icons 212 included in another layer.

When a user selects icon 203 for weather information, the control unit of the network TV 30 first displays an image in which it snows on the layer including the background image 201. Thereafter, the control unit 50 estimates an image in which snows falls and collects on the icons 212 in consideration of the size and position of the icons 212, and performs control for displaying the estimated image. Moreover, the image of snow collecting on the icons 212 may be displayed on either layer 213 or layer 213'.

Figure 22:
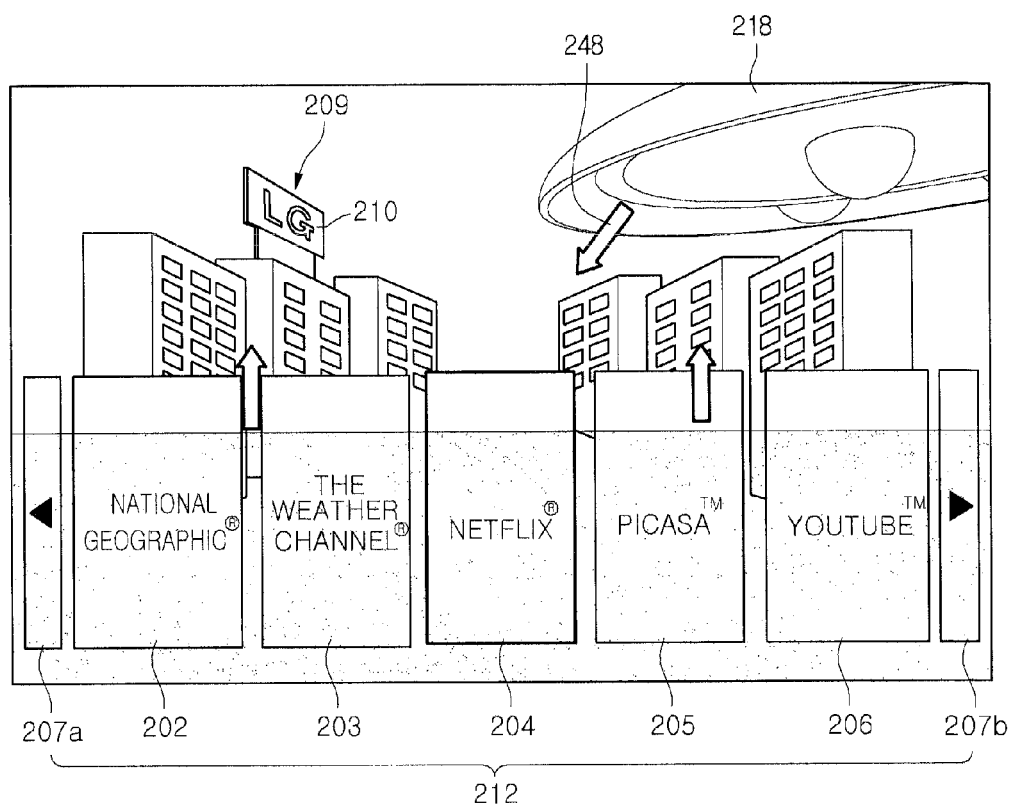
FIGS. 22 and 23 show screens that display effects performed in accordance with one or more embodiments described herein.
Figure 23:
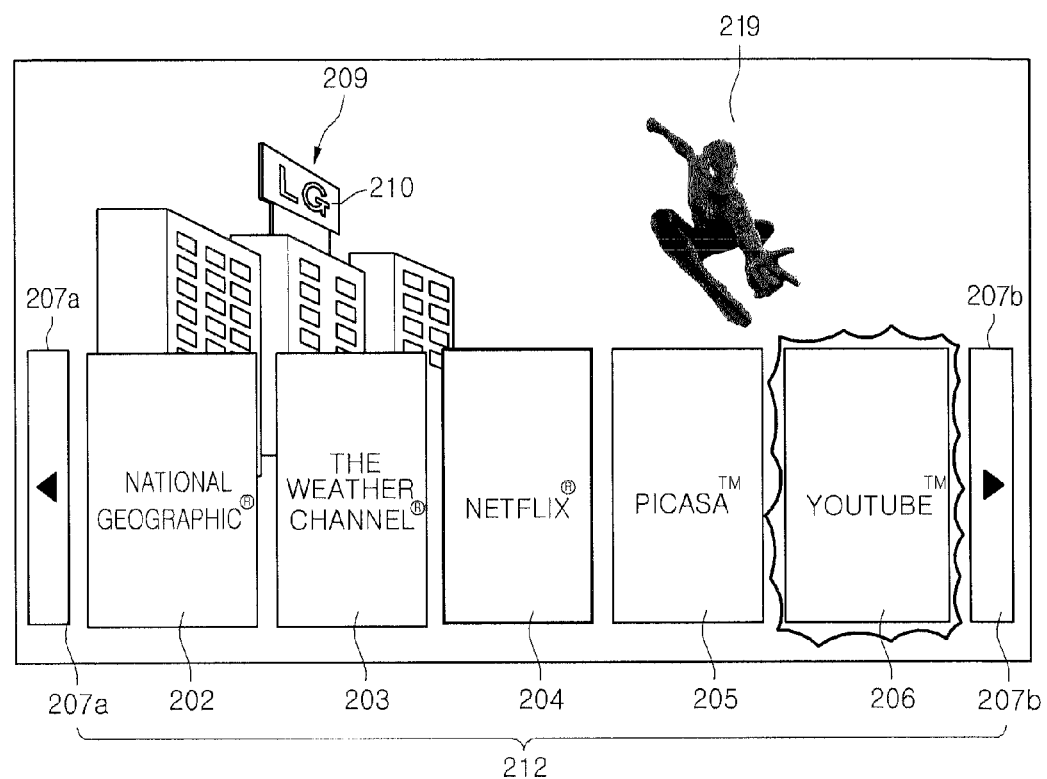

FIGS. 22 and 23 show screens that include effects performed among a plurality of layers. Referring to FIG. 22, upon selection of an icon 204 of the content provider 20 providing movie content, an image related to an object in a movie, for example, a large spaceship 218, may appear at an upper portion to be displayed. The image of the spaceship may be displayed on the layer that includes the background image 201. It is possible to gradually darken the screen while the shadow of the spaceship gradually increases in size from the lower end of the background image, and also gradually darken icons 212 from the lower end, as the spaceship 218 moves in the direction of an arrow 248. In this configuration, it may be possible to display the shadow influencing icons 212 on the layer that includes the icons 212. When an image having the moving spaceship is displayed, the control unit 50 of the network TV 30 may estimate a shadow image that will be displayed over icons 212 in consideration of the size and position of the icons 212, then display the shadow over the icons 212 on the basis of the estimated result.

Referring to FIG. 23, it is possible to show an image in which a character of a movie, for example, Spiderman 219 appears and makes an action hitting one 206 of the icons or shooting webs when a user selects icon 204 of the contents provider providing movie content. The image of Spiderman 219 may be displayed on the layer including the background image 201. It is possible to display an image in which icon 206 falls forward or webs are entangled by an action of Spiderman. It is possible to display the image in which icon 206 falls or webs are entangled on the layer including the icon. Various other animations or special effects may be possible based on the subject matter of the displayed images or advertisements.

Figure 24:
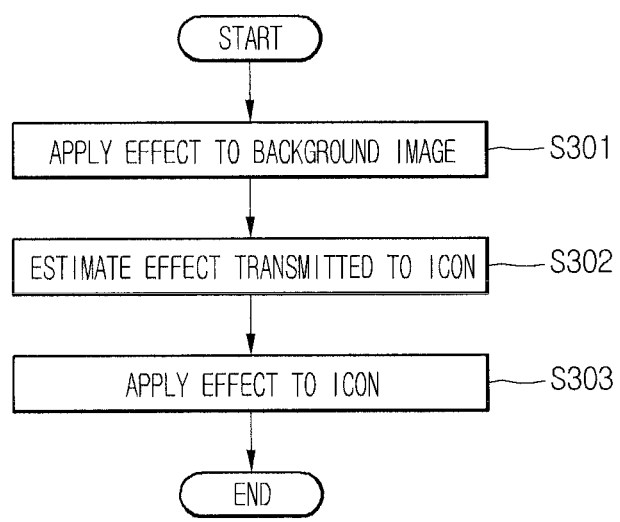
FIG. 24 is a flowchart of a method for performing effects in accordance with one or more embodiments disclosed herein.

FIG. 24 shows operations included in one embodiment of a method for performing an effect in accordance with image display between layers in a menu screen. In step S301, an effect is applied to a layer including a background image in menu screen. In step S302, as the effect applied to the background image appears, effects that will be transmitted to the icons or images that will be displayed are estimated, and in step S303, the estimated effects are applied to the icons.

Figure 25:
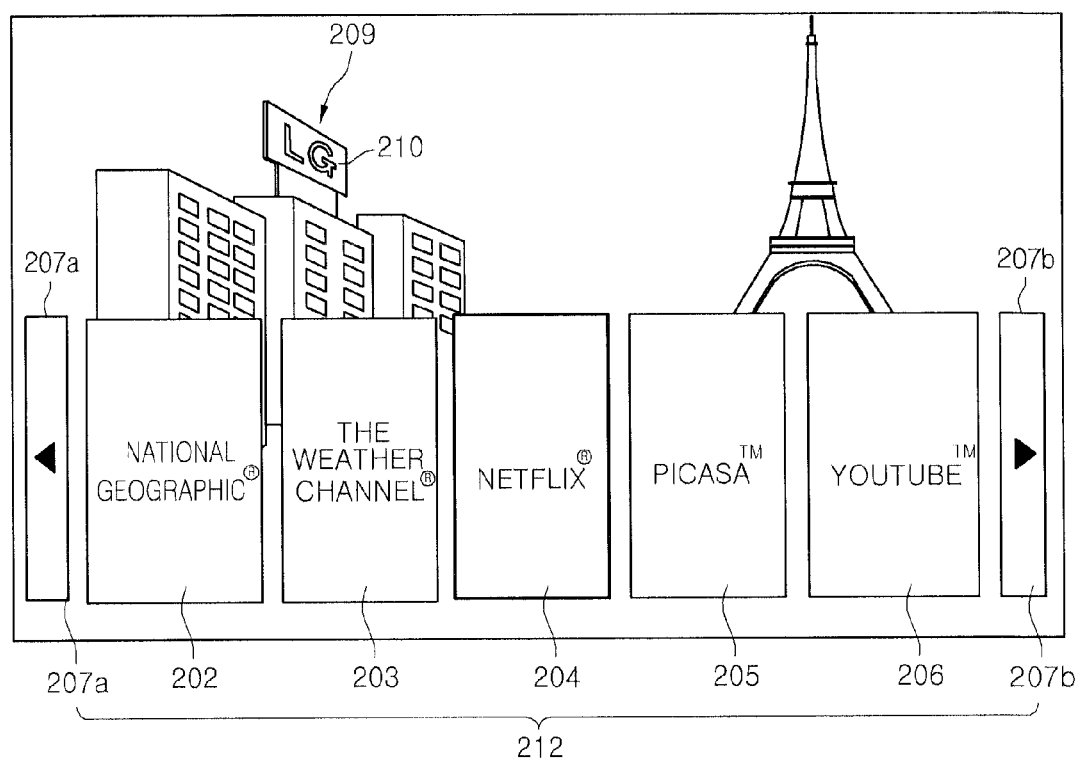
FIGS. 25 to 30 show screens containing background images that change based on condition information of a user or a network TV in accordance with one or more embodiments disclosed herein.
Figure 26:
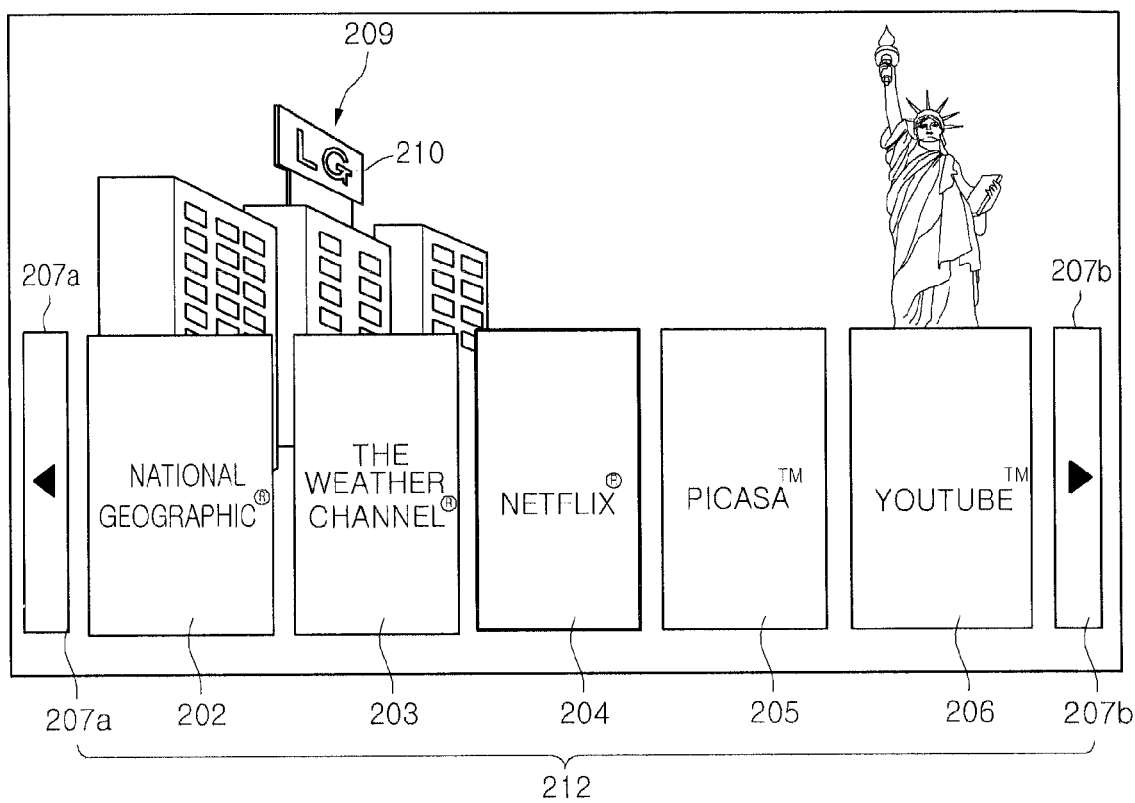

According to one embodiment, it is possible to acquire predetermined condition information of a user or the network TV 30, for example, information related to an area of the user, time, or seasons, and then automatically change the background image 201 in accordance with the condition information. For example, if the user is located in Paris as shown in FIG. 25, it is possible to display a background image 201 including the Eiffel Tower (or another landmark of Paris), and when the area is New York, it is possible to display a background image including the Statue of Liberty (or another landmark of New York) as shown in FIG. 26. The area information of a user may be set by the user, or received from the network operator 10 or the content provider 20 and stored in the network TV 30. Further, it is possible to change the background image 201 when the area information is changed by a user or when the user moves out of the area.

Figure 27:
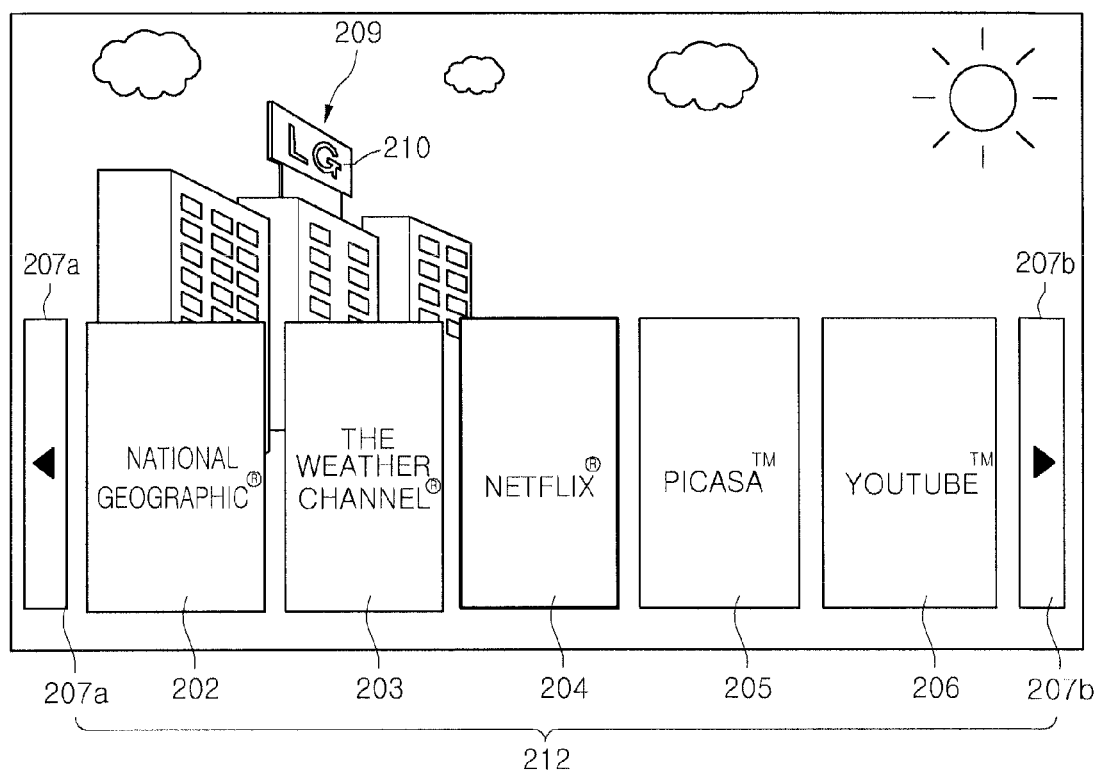
Figure 28:
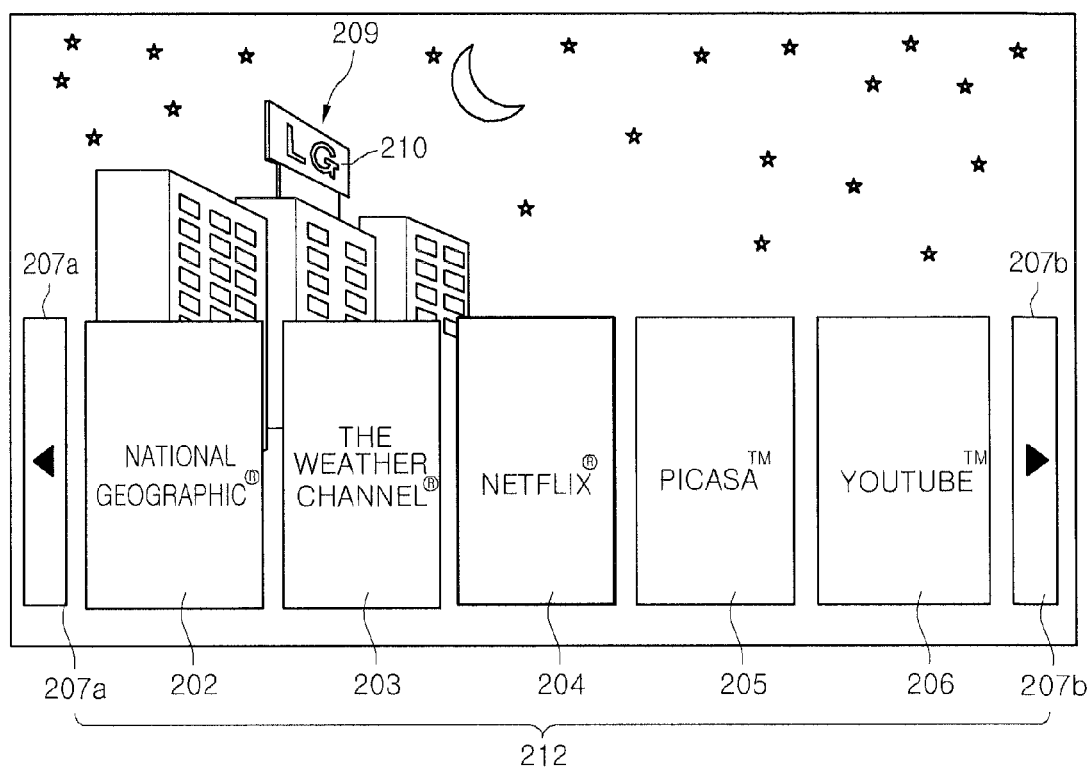
Figure 29:
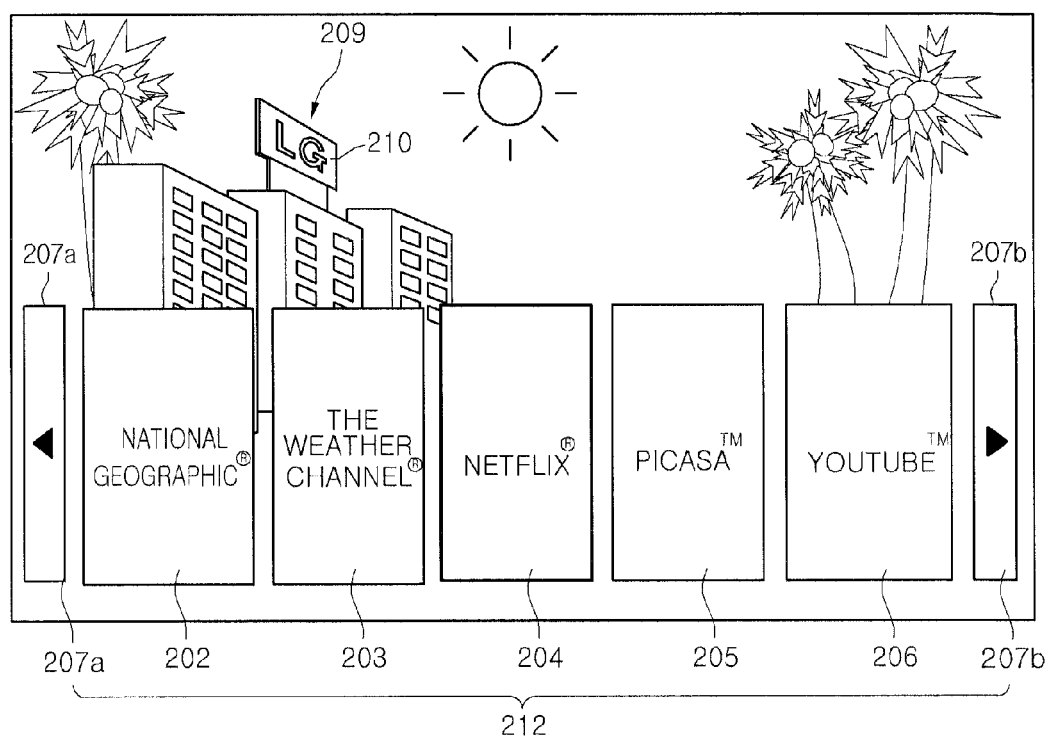
Figure 30:
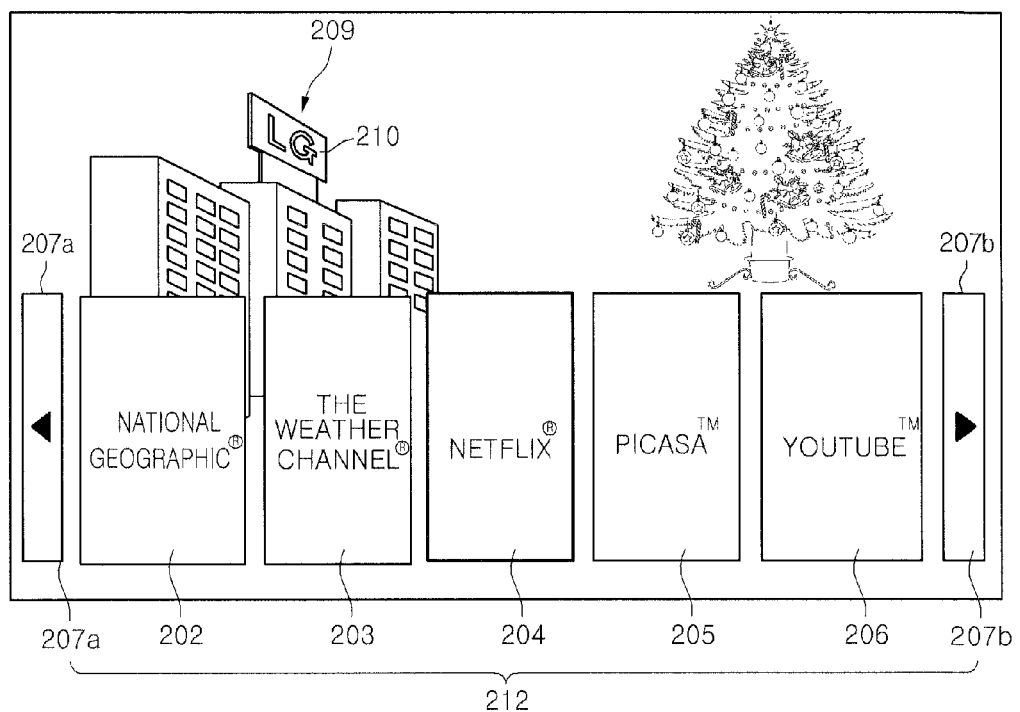

Further, as shown in FIGS. 27 and 28, it is possible to display a background image 201 including a night view or an image including a day view on the basis of the current time information. Further, the background image 201 may include an effect or image corresponding to a particular season of the year, when that season currently exists. For example, it is possible to display a background image 201 that includes a summer view in the summer, as shown in FIG. 29, and a winter view in the winter, as shown in FIG. 30.

The time or weather information necessary for implementing the aforementioned embodiments may be received, for example, from the network operator 10 and content provider 20 and/or may be extracted from a broadcast signal. In addition, an active menu screen may be displayed by changing the background image 201 in various ways in accordance with condition information related to the user or the network TV 30.

Figure 31:
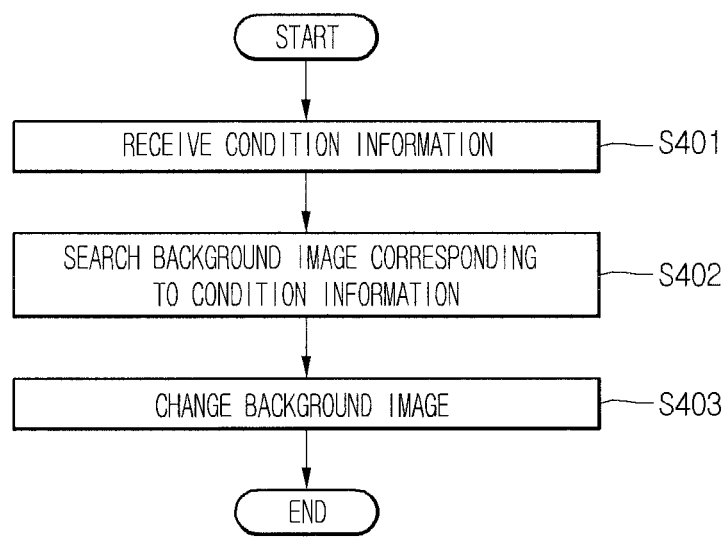
FIG. 31 is a flowchart of a method for changing a background image in accordance with one or more embodiments disclosed herein.

FIG. 31 shows operations included in one embodiment of a method for changing a background image in accordance with condition information from a user or a network TV 30. In step S401, a network TV 30 receives condition information of a user or the network TV 30 from network operator 10 or content provider 20. The condition information may include area information of a user, time and date, or seasonal information. Also, the condition information may be extracted from a broadcast signal that the network TV 30 has received or provided by the user.

In step S402, a background image corresponding to the condition information may be searched. In step S403, the background image may be changed into the searched background image. It is possible not to change the background image when the current displayed environment information is consistent with the background image. Further, the function may be deactivated when a user does not want to change the background image.

Figure 32:
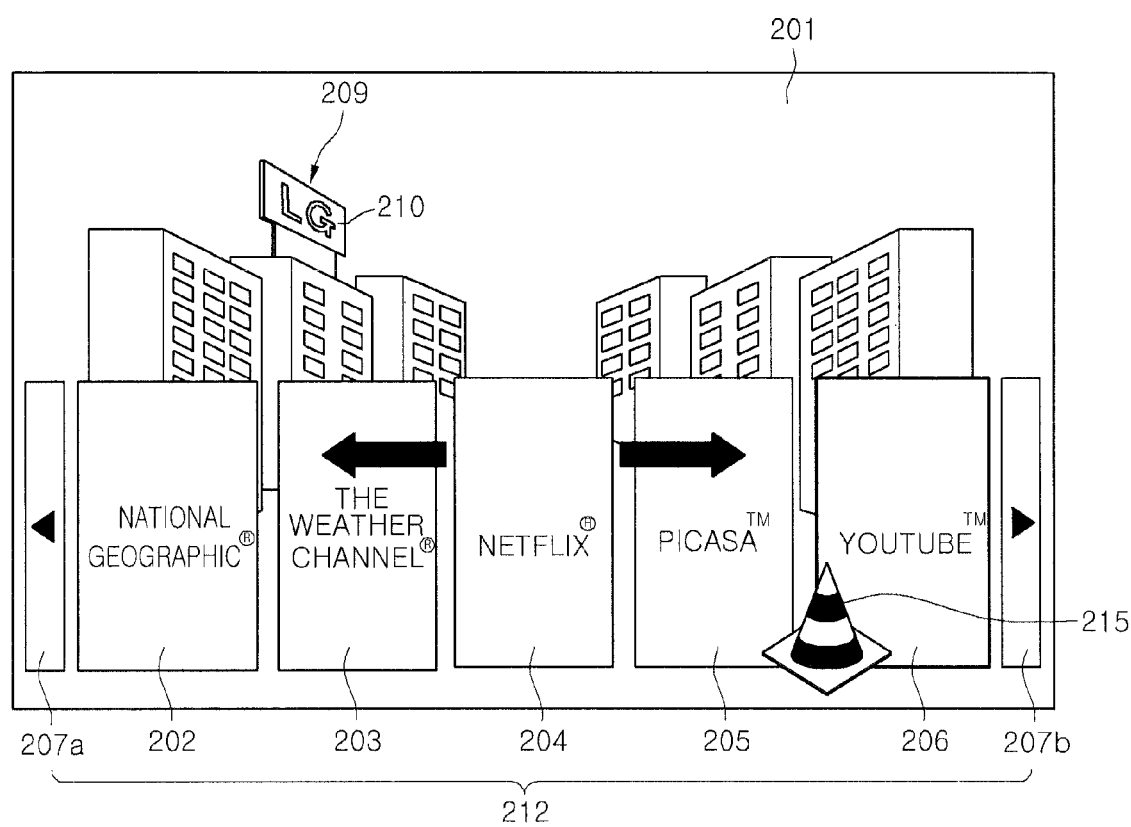
FIGS. 32 to 34 show screens that display notifications of various problems encountered during operation of the network TV.

According to one embodiment, when a problem is detected while monitoring the service condition of each content provider 20 or the network condition of the network TV 30, it is possible to display information providing notification of or a reason for the problem on the menu screen. When a content provider 20 cannot provide a service due to server check or maintenance, it is possible to display a notice that service is unavailable on the menu screen. For example, as shown in FIG. 32, it is possible to display that service is unavailable on the corresponding icon 206, to display an intuitive image, for example, a graphic image 215, "Under Construction."

Figure 33:
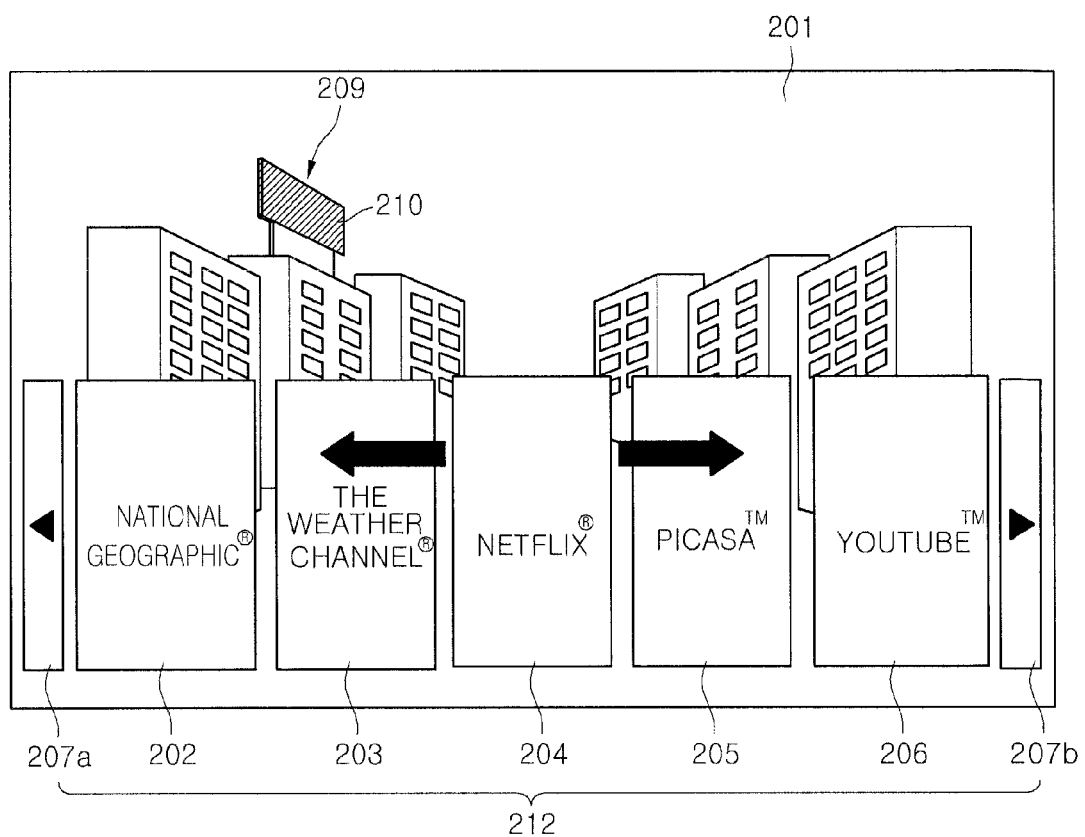
Figure 34:
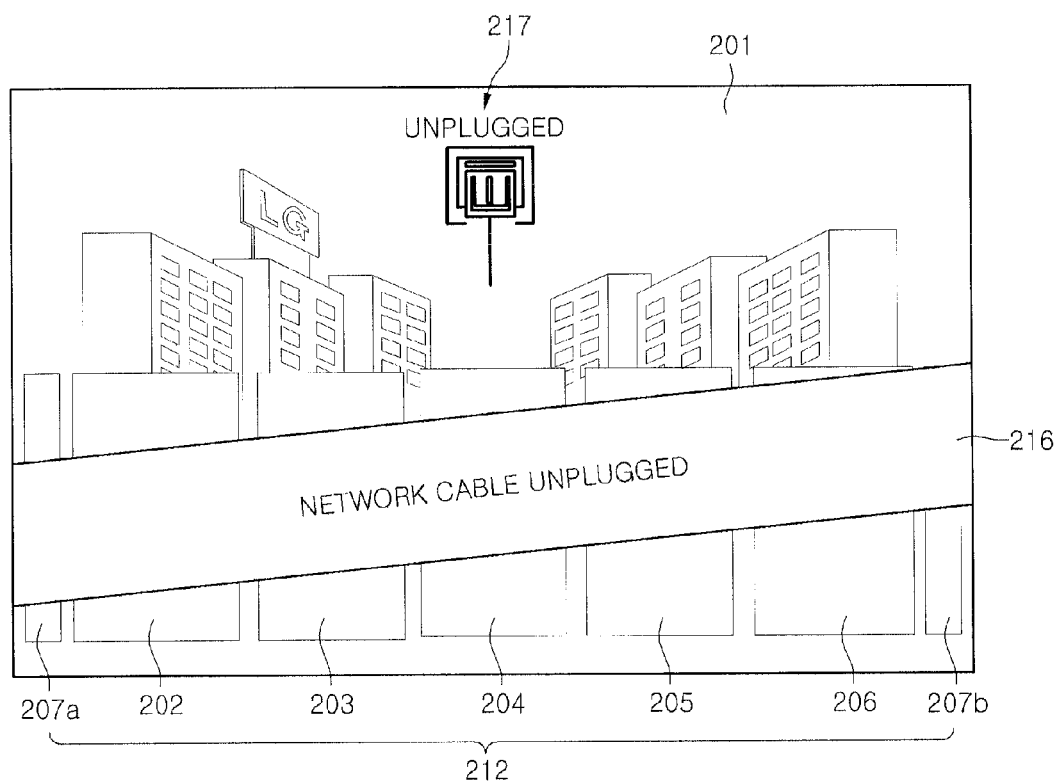

Further, according to one embodiment, it is possible to display information related to the connection condition or network status between the network TV 30 and the content provider 20 or the network operator 10 on the menu screen. For example, as shown in FIG. 33, with the NetCast™ mode executed, it is possible to vary the brightness of the advertisement image 210 displayed in the image display region 209 included in the background image 201 in accordance with the network connection condition. That is, it is possible to brighten the advertisement image 210 when the network connection condition is good, and it is possible to darken the advertisement image 210 when the connection condition is poor. The above configuration may enhance the user interface and provide a user with interest or otherwise engage the user as compared to when displaying the network condition by using a common text or graph, etc. Further, according to one embodiment, when a user attempts to execute the NetCast™ mode, and the network cable of the network TV 30 is either unplugged or the interface is not operated as shown in FIG. 34, it may be possible to display this condition throughout the menu screen. In this case, it is possible to display a menu screen that is more intuitive and which provides a user with interest, as when compared to notifying the user with a common text, by displaying a predetermined graphic image 217 to indicate that the cable is unplugged. For example, a block tape 216 used in general construction sites as shown in FIG. 34 may be displayed. In this case, because the NetCast™ service is completely unavailable, it is possible for a user to intuitively be informed of this problem by translucently or dimly displaying the images on the menu screen, that is, the background image 201 and/or the icons 212, except for expressions 216 and 217 informing that the network interface is not operated.

Figure 35:
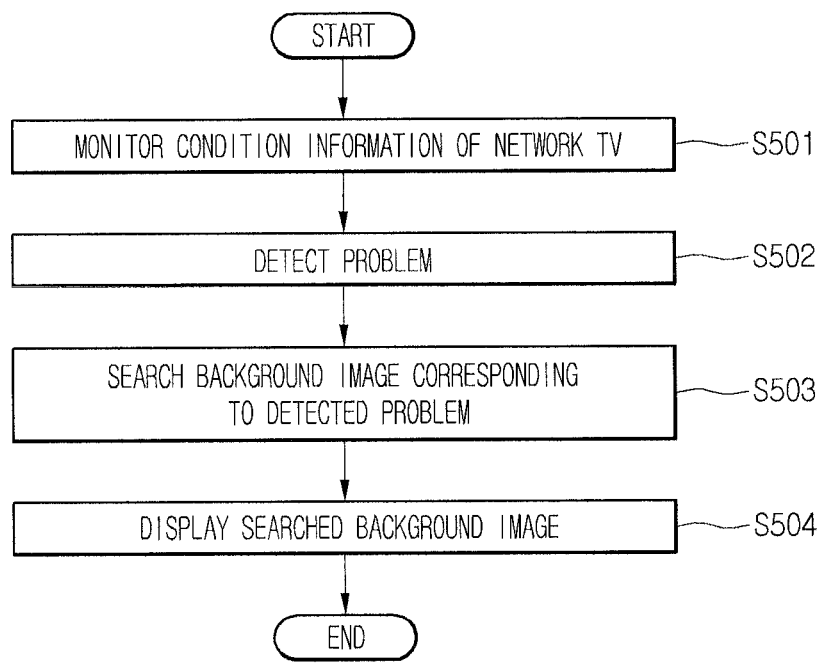
FIG. 35 is a flowchart of a method of displaying problems on a menu screen in accordance with one or more embodiments disclosed herein.

FIG. 35 shows operations included in one embodiment of a method for changing a menu screen in accordance with a condition of a content provider or a network TV 30. The condition information of the network TV 30 may be monitored in step S501, and a problem may be detected in step S502. A background image corresponding to the detected problem may be searched in step S503, and the image corresponding to the detected problem may be displayed in step S504.

Figure 36:
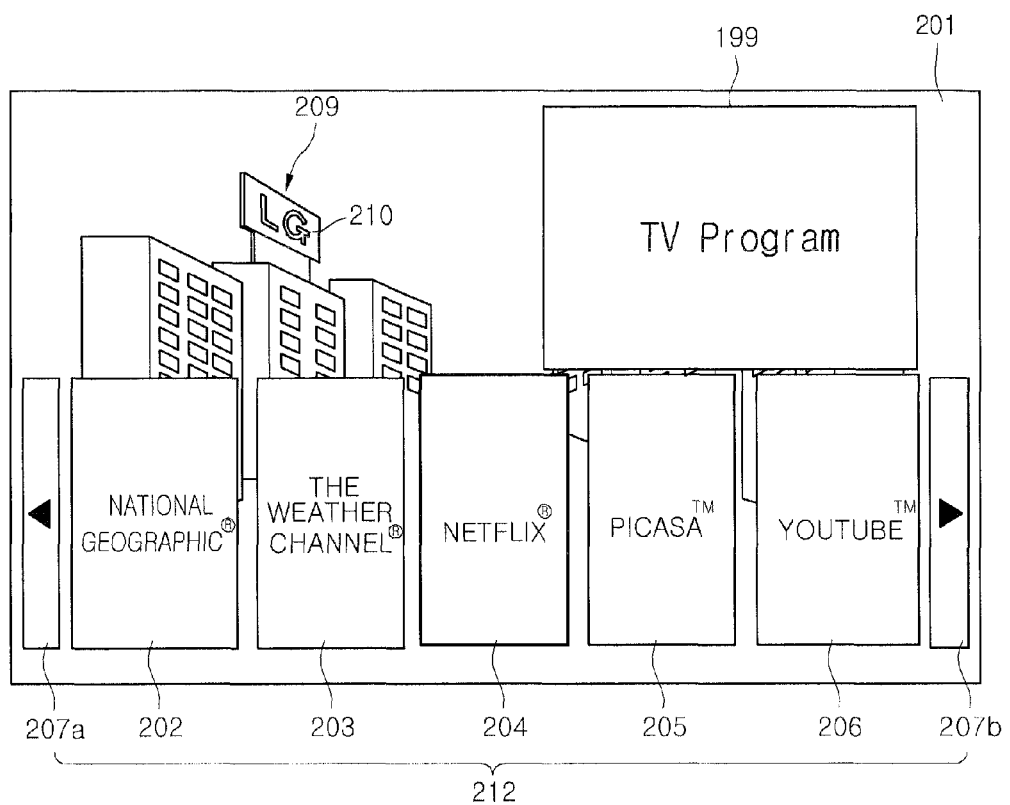
FIG. 36 shows another embodiment of a menu screen that is displayed at a same time a television signal is displayed.

In accordance with another embodiment as shown in FIG. 36, a television signal containing a television program 199 may be displayed at the same time the menu screen containing the background image 201 and content provider icons 212 are displayed. The television program 199 may be displayed at a fixed or adjustable region in the background image 201, at another location within the menu screen, or at an area outside of the menu screen. For example, the television program 199 may be displayed in a picture-in-picture signal area of the television screen.

Figure 37:
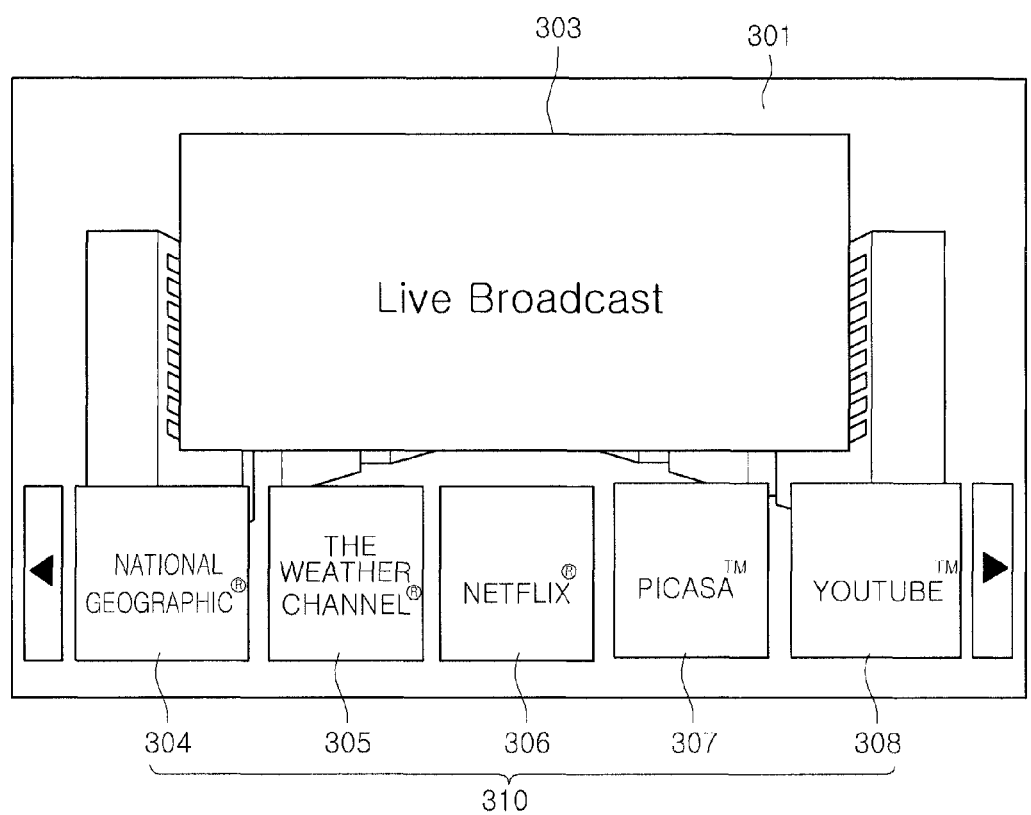
FIG. 37 shows a menu screen of a network TV according to an embodiment of the present disclosure.

FIG. 37 is a diagram showing a menu screen of a network TV 30 according to an embodiment. In this embodiment, a window 303 that outputs or displays a video (e.g. a broadcast signal) are included in the menu screen of FIG. 37 in addition to the menu buttons 310. In this embodiment, as in previous embodiments, icons 310 and background image 301 may include one theme. The window 303 that displays the video may be located at the center of the entire screen and may occupy most of the display screen. For example, the window 303 may occupy an area larger than the sum of the entire area in which the icons 310 are displayed. The menu screen as shown in FIG. 37 allows content providers 20 represented by the icons 310 to be easily accessed by a user.

Figure 38:
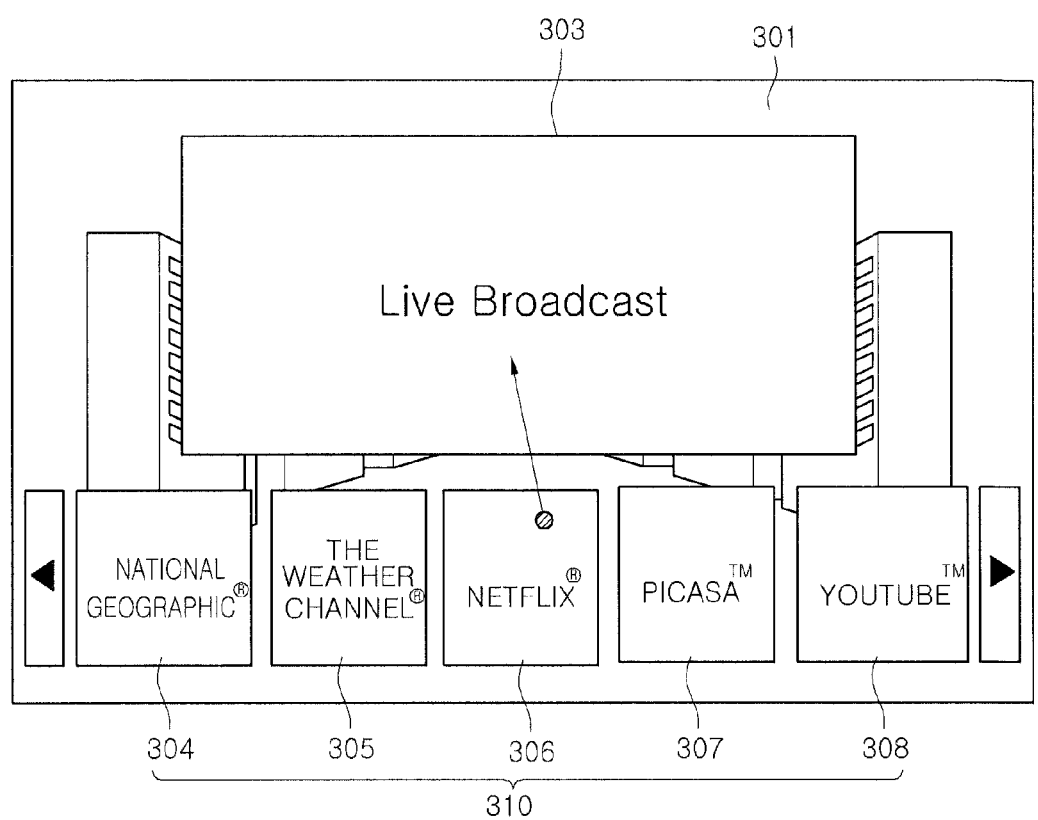
FIGS. 38 and 39 show a method of switching between a real-time broadcast screen and a content screen according to an embodiment of the present disclosure.
Figure 39:
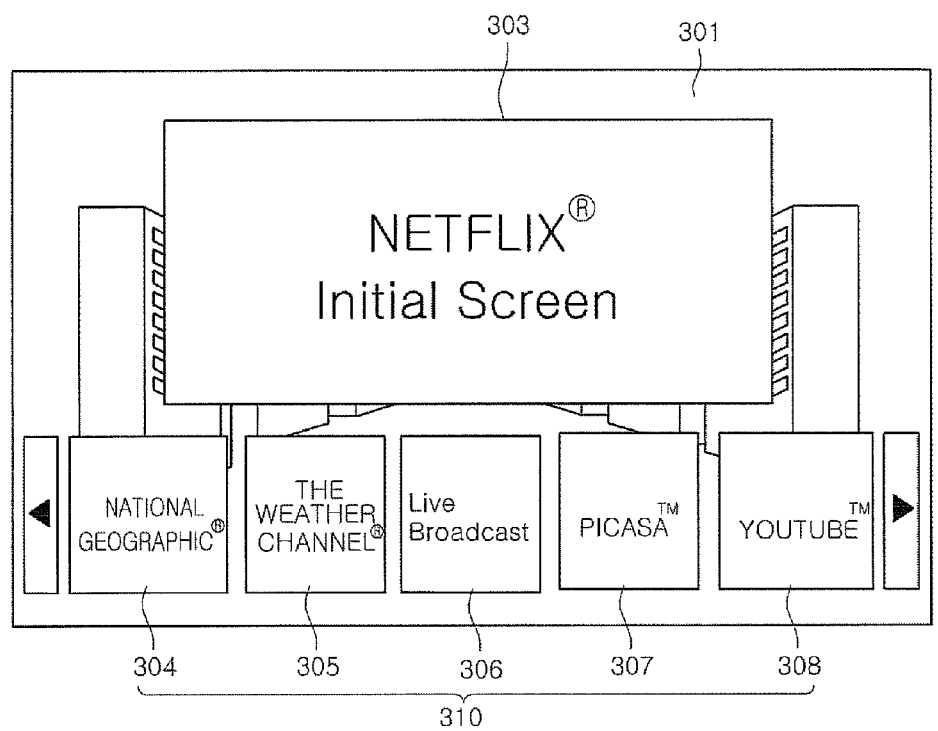

Further, as shown in FIG. 38, when a user selects one icon 306 from the icons 310 to drag-and-drop icon 306 in window 303 where the video is displayed, a server represented by the icon 306 may be accessed, for example, the Netflix® server may be accessed. Then, as shown in FIG. 39, Netflix® server's initial screen or homepage may be displayed at a location where the window 303 was originally displayed.

A gesture by the user to select and drag-and-drop the icon 306 in window 303 may be inputted by using the above-mentioned motion recognition remote controller 51. For example, when the user points and selects the icon 306 by means of the motion recognition remote controller 51, holds down a predetermined button and drags the icon 306 to the location of the window 303, and releases the button, the above-mentioned operation may be performed.

Thereafter, the video, originally displayed in window 303, may be displayed at the location of the icon 306 in an area having the same size as the icon 306. That is, the locations of the window 303 that outputs the video and the icon 306 are switched between each other by the above gesture. Accordingly, the user may continue to view the video while browsing the content server.

In the network TV 30 according to this embodiment, the video as well as other content may be accessed from a plurality of content provider servers through a network. As shown in FIG. 37, the user may access the content provider server by using an intuitive gesture while watching a video by using the menu screen in which the window 303 outputting the video and the icons 310 for accessing the content provider 20 are displayed at the same time.

Figure 40:
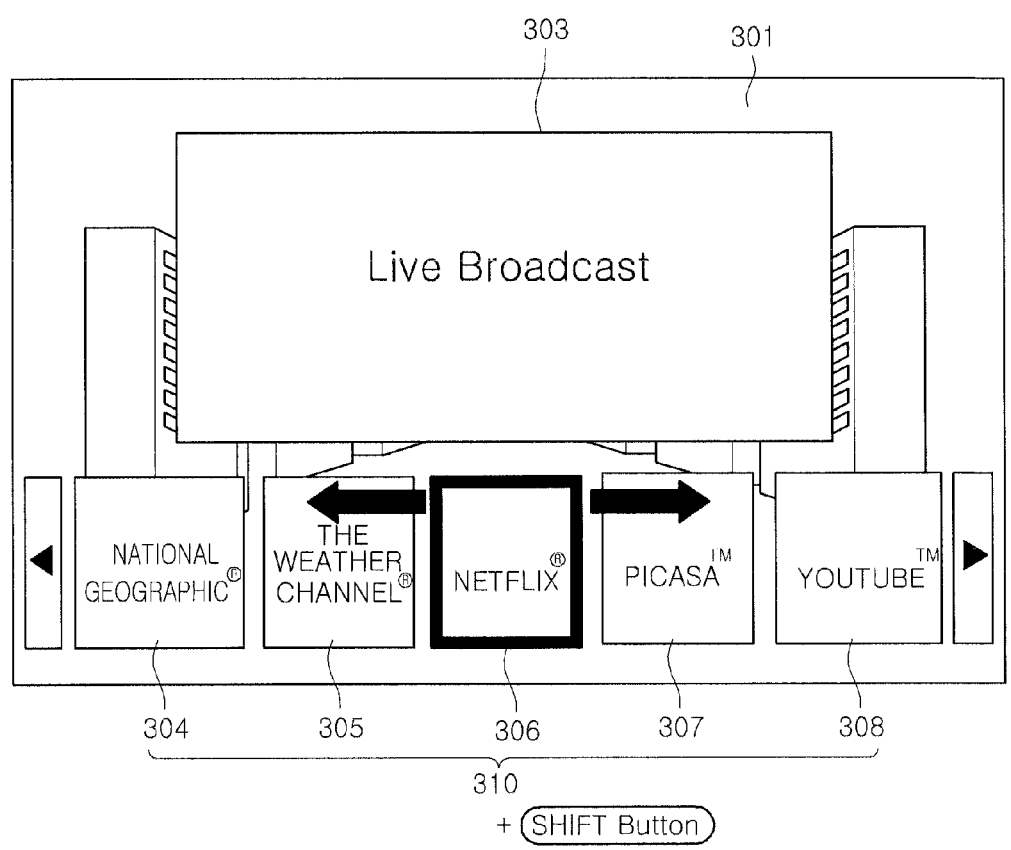
FIGS. 40 and 41 show a method of switching between a real-time broadcast screen and a content screen according to another embodiment of the present disclosure.
Figure 41:
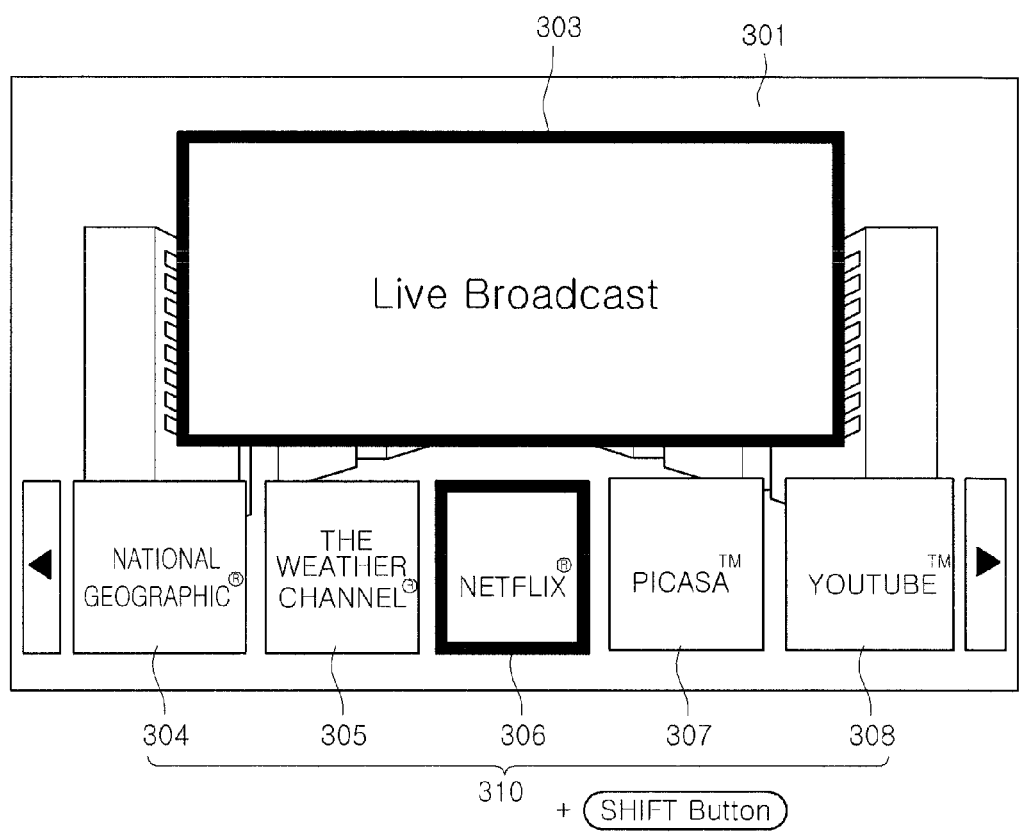

According to this embodiment, the operation may be implemented by other types of input devices in addition to the drag-and-drop gesture by the motion recognition remote controller 51. As shown in FIG. 40, while the menu screen is being displayed, if the user selects one icon 306 from the icons 310 by using a conventional remote controller, then selects the window 303 that is outputting the video as shown in FIG. 41 by using an arrow button while pressing a shift key on the remote controller or a button corresponding thereto, the network TV 30 may access the content provider 20 of the icon 306. The initial screen of the content provider server may then be displayed at the location of the window 303. For example, the network TV 30 may display a homepage of the content provider server in window 303. In the above configuration, a controller 50 of the network TV 30 may take a first selection of the icon 306 as a designation to move the icon 306, and a second selection as a designation of a location to which the icon 306 will be moved. In another embodiment, a designated button may be provided such that a selection of an icon with the designated button automatically opens a corresponding webpage of the icon 306 in window 303. Alternatively, when a selection button is depressed for a predetermined amount of time when selection icon 306, the webpage corresponding to the icon 306 may also be automatically displayed without additional inputs.

In the embodiments disclosed herein, simply for ease of explanation, examples of operation in the NetCast™ mode has been described, in which an operation mode is changed using icons representing content providers 20 while the broadcast screen of the network TV 30 is being displayed. However, the embodiments may be applicable even when another predetermined screen is being displayed instead of the broadcast screen. For example, when the network TV 30 has an additional function, such as DVD connection function or a game player function, the icons 310 of the content provider 20 may be displayed while the DVD is being played, or the game is being played, and the user may access the content provider server by using the icons 310.

Figure 42:
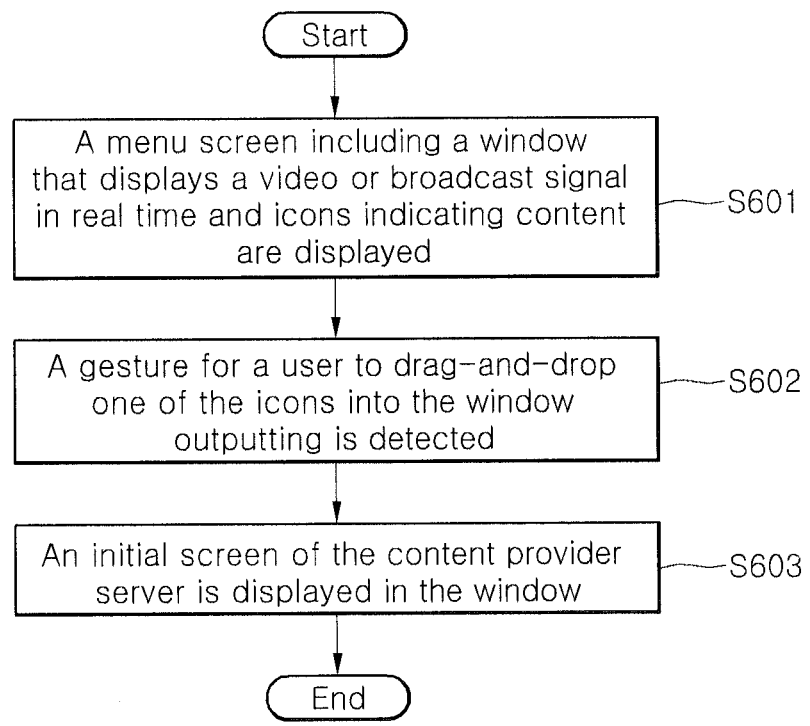
FIG. 42 is a flowchart of a method of switching between a real-time broadcast screen and a content screen according to an embodiment of the present disclosure.

FIG. 42 shows a flowchart showing a method of accessing a content server by inputting a user's intuitive gesture according to an embodiment. At Step S601, a menu screen including a window that displays a video or a broadcast signal in real-time, for example, a live video viewing window and icons representing content providers 20 are displayed. Alternatively, a video from a local source such as a DVD player may be displayed. At this time, the menu screen may be a main screen which is displayed when a TV is powered on. That is, unlike the above-mentioned embodiments, the menu screen may be displayed regardless of whether or not a NetCast™ service mode is executed. At Step S602, a gesture of a user to drag-and-drop one of the icons to the window outputting the video or broadcast signal is detected. As described above, such a gesture may be detected by a motion recognition remote controller. At Step S603, a content provider server corresponding to the drag-and-dropped icon is accessed and an initial screen of the content provider server may be displayed on the window that originally displayed the video or broadcast signal.

In the above-mentioned method, the drag-and-drop gesture may be substituted by a method as shown in FIGS. 40 and 41. Further, the drag-and-drop gesture may be substituted by a predetermined input for moving the icon to the window that displays the broadcast signal.

A display apparatus, as broadly described and embodied herein, may include an interface configured to receive content from a content provide; a signal processor configured to process the received video signal to display a video or an image corresponding to the video signal in a window; an input interface configured to receive input to move at least one of a plurality of icons to the window that displays the video signal, wherein each of the plurality of icons are associated with at least one of a plurality of content provider; a controller configured to display on the window an initial screen of the content provider associated with the at least one of the plurality of icons in response to the input; and a display configured to display the plurality of icons, the window, the video and the initial screen of the content provider.

In the display apparatus, in response to the input, the controller is configured to display the video signal at a location on the display where the moved icon was originally positioned, wherein the input may be a gesture to drag-and-drop the at least one of the plurality of icons to the window that displays the video. Moreover, the gesture may be detected by a motion recognition remote controller that controls the display apparatus, wherein the window is positioned centrally on the display, and wherein an area occupied by the window is greater than an area occupied by the plurality of icons. The input may include selecting the at least one of the plurality of icons and selecting the window that outputs the video signal.

A method of providing a menu on a display device connected to a network is broadly described and embodied herein, comprising displaying a menu screen including a window that displays a video and a plurality of icons representing one or more content providers; detecting an input to move at least one of the plurality of icons to the window; accessing, in response to the input, a server represented by the moved icon; and displaying an initial screen of the content provider on the window.

In this method, detecting the input to move the at least one of the plurality of icons may include moving the at least one of the plurality of icons from a first position located outside the window to a second position located within the window, wherein the method may further comprise displaying the video at the first position and displaying the initial screen of the content provider in the window. Moreover, the input may be a gesture to drag-and-drop the at least one of the plurality of icons from a first position located outside the window to a second position located within the window, wherein the gesture is detected by a motion recognition remote controller that controls the display device, and wherein the window may be positioned centrally on the display on the display device, wherein an area occupied by the window is greater than an area occupied by the plurality of icons. The input may further include selecting the at least one of the plurality of icons and selecting the window that display the video.

Another method of controlling a network display device is broadly described and embodied herein, comprising displaying a first content in a window on the network display device; displaying a plurality of icons on the network display device, wherein the plurality of icons are linked to at least one of a plurality of content servers; receiving an input to move at least one of the plurality of icons from a first position to a second position, wherein the second position is located inside the window displaying the first content; in response to the input, retrieving a second content from the at least one of the plurality of content servers; and replacing the first content with the second content in the window.

In this method the first content may be a live broadcast, the method further comprising receiving a broadcast signal and displaying the live broadcast in the window, and wherein the second content is a homepage of the at least one of the plurality of content servers, wherein the second content is received at the network display device from the at least one of the plurality of content servers through a network connection. Moreover, the method may include replacing the first content with the second content in the window may comprise replacing the live broadcast with the homepage. This method may also comprise displaying the first content in the second position, wherein receiving the user input comprises an instruction to drag-and-drop the at least one of the plurality of icons from the first position to the second position, and wherein receiving the input further comprises detecting at a motion recognition remote controller a gesture to drag-and-drop the at least one of the plurality of icons from the first position to the second position. The first content may include an output from at least one of a live broadcast, a DVD player or a game console, and the second content may include content from the content server associated with the moved icon.

Other than the embodiments described above, there may be content providers that provide various types of content in a network TV, and the images relating to contents that are displayed each time the icons of the content providers are selected may be changed in accordance with embodiments. A display device connectable to a network may include a network interface unit configured to receive contents by being connected with a content provider server through a network; a broadcast signal processing unit configured to receive a broadcast signal and process it as an outputtable signal; a user interface unit configured to receive user input for moving one of icons indicating content providers to a window outputting the broadcast signal; a control unit configured to display an initial screen of the content provider server represented by the icon on the window in response to the user input; and a display unit configured to display the window outputting the broadcast signal and the window and display the initial screen of the content provider server represented by the icon on the window under the control unit's control.

A method of providing a menu in a display device accessible to a network may include displaying a menu screen including a window outputting broadcast signal and a plurality of icons representing content providers; detecting user input to move one of the moved icons to the window; accessing a content provider server represented by the moved icon; and displaying an initial screen of the content provider server on the window.

According to an embodiment, it may be possible to provide a method of displaying and selecting a menu to a user in a network TV system. According to an embodiment, it may be possible to provide an effective method of transferring a message or an advertisement in the network TV system. Further, according to an embodiment, it may be possible to provide a method of accessing a content provider server while watching a broadcast screen in real time.

The embodiments described herein may be implemented by a program that may be executed by a common processor, such as a computer, and may be implemented by using a flash application or a 3D-flash application. The implemented program may be stored in a computer-readable recording medium in the network TV. Examples of the computer-readable recording media include a ROM, a RAM, a CD-ROM, a magnetic tape, a floppy disk, and an optical data storage. In addition, the program may be implemented in a recording medium in the form of a carrier wave (for example, transmission through the Internet).

Further, the computer-readable recording media may be distributed on computer systems connected through the network, and thus the computer-readable recording media may be stored and executed as computer-readable code in a distribution scheme. Further, functional programs, codes, and code segments for implementing a method of receiving broadcast signals may be easily inferred by programmers in the related art.

This application is related to U.S. patent application Ser. No. 12/902,547 filed on Oct. 12, 2010, whose entire disclosure is incorporated herein by reference.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus, comprising:
    an interface to receive a plurality of graphical content from a plurality of content providers;
    a signal processor to process a received video signal;
    a display to display a menu screen that is implemented by overlapping a first layer including a background image with a second layer including one or more icons corresponding to one or more providers and a window;
    an input interface to receive an input signal selecting the icon corresponding to one of the plurality of graphical content; and
    a controller to display the video signal on the window, and in response to the user input to select one of the plurality of icons, to access a content provider server corresponding to the selected icon, to control the display to display on the window an initial screen of the accessed content provider server, to display on top of the selected icon a video content associated with the accessed content provider, to display a background image corresponding to the selected icon, wherein the background image corresponding to the selected icon is based on information received through the interface from the content provider server, to apply a first effect based on the information received through the interface from the content provider server to the background image of the first layer, to display the background image of the first layer applied with the first effect while determining a second effect based on the first effect for overlaying on one or more icons, and to apply the second effect to the one or more icons of the second layer and display both the background image of the first layer applied with the first effect and the one or more icons applied with the second effect by overlapping the first layer with the second layer.

2. The display apparatus of claim 1, wherein the user input is a command that selects and holds the one of the plurality of icons, drag the selected icon to the window, and release the selected icon.

3. The display apparatus of claim 1, wherein the user input is detected by a motion recognition remote controller that controls the display apparatus.

4. The display apparatus of claim 1, wherein the window is positioned centrally on the display, wherein an area occupied by the window is greater than an area occupied by the plurality of icons.

5. The display apparatus of claim 1, wherein the user input includes selecting a prescribed button on the remote controller, holding the predetermined button while dragging the selected icon to the window and releasing the prescribed button when the selected icon is in the window.

6. A method of providing a menu on a display device, comprising:
    displaying a menu screen that is implemented by overlapping a first layer including a background image with a second layer including one or more icons, and a window, wherein the one or more icons correspond to a plurality of content providers to access content from a corresponding content provider, and the window displays a received video signal;
    receiving an input signal selecting an icon corresponding to one of the plurality of content providers;
    in response to the input signal to select one of the plurality of icons, accessing a content provider server corresponding to the selected icon;
    displaying, on the window, an initial screen of the accessed content provider server;
    displaying, on top of the selected icon a video content associated with the accessed content provider;
    displaying a background image corresponding to the selected icon, wherein the background image corresponding to the selected icon is based on information received from the content provider server,
    applying a first effect based on the information received through the interface from the content provider server to the background image of the first layer;
    displaying the background image of the first layer applied with the first effect while determining a second effect based on the first effect for overlaying on one or more icons; and
    applying the second effect to the one or more icons of the second layer and displaying both the background image of the first layer applied with the first effect and the one or more icons applied with the second effect by overlapping the first layer with the second layer.

7. The method of claim 6, wherein the input signal is detected by a motion recognition remote controller that controls the display device.

8. The method of claim 6, wherein the window is positioned centrally on a display on the display device, wherein an area occupied by the window is greater than an area occupied by the plurality of icons.

9. The method of claim 6, wherein the input signal includes selecting a prescribed button on the remote controller, holding the prescribed button while dragging the selected icon to the window and releasing the prescribed button when the selected icon is in the window.

10. The method of claim 6, wherein the video includes an output from at least one of a live broadcast, a DVD player, or a game console.

11. The method of claim 6, wherein the content is a homepage of a content provider, wherein the content is received from a server of the content provider through a network connection.

* * * * *